US011396574B2

(12) United States Patent
Rabnawaz et al.

(10) Patent No.: US 11,396,574 B2
(45) Date of Patent: Jul. 26, 2022

(54) SELF-HEALING, SELF-CLEANING OMNIPHOBIC COMPOSITION, RELATED ARTICLES AND RELATED METHODS

(71) Applicant: BOARD OF TRUSTEES OF MICHIGAN STATE UNIVERSITY, East Lansing, MI (US)

(72) Inventors: Muhammad Rabnawaz, East Lansing, MI (US); Ajmir Khan, Lansing, MI (US); Kun Huang, Havertown, PA (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 17/419,778

(22) PCT Filed: Jan. 2, 2020

(86) PCT No.: PCT/US2020/012011
§ 371 (c)(1),
(2) Date: Jun. 30, 2021

(87) PCT Pub. No.: WO2020/142578
PCT Pub. Date: Jul. 9, 2020

(65) Prior Publication Data
US 2022/0041787 A1 Feb. 10, 2022

Related U.S. Application Data

(60) Provisional application No. 62/787,559, filed on Jan. 2, 2019.

(51) Int. Cl.
*C08G 18/61* (2006.01)
*C08G 18/10* (2006.01)
(Continued)

(52) U.S. Cl.
CPC ........... *C08G 18/10* (2013.01); *C08G 18/325* (2013.01); *C08G 18/3228* (2013.01);
(Continued)

(58) Field of Classification Search
CPC ...... C08G 18/325; C08G 18/61; C08G 18/10; C08G 18/3228; C09D 175/04; C09D 175/06
See application file for complete search history.

(56) References Cited

U.S. PATENT DOCUMENTS 4,683,171 A  7/1987 Kuga et al.
5,798,409 A * 8/1998 Ho .......................... C08G 18/10
                                                          528/80
(Continued)

FOREIGN PATENT DOCUMENTS

WO  WO-2019/099608 A1  5/2019

OTHER PUBLICATIONS

"Dynamic urea bond for the design of reversible and self-healing properties" Ying et al. Nature Communications 5:3218. p. 1-0, 2014.*
(Continued)

*Primary Examiner* — Michael L Leonard
(74) *Attorney, Agent, or Firm* — Marshall, Gerstein & Borun LLP

(57) ABSTRACT

The disclosure relates to a self-healing omniphobic composition including a self-healing omniphobic polymer with a crosslinked backbone. The crosslinked backbone includes a reaction product between a polyisocyanate, a functionalized omniphobic polymer reactive therewith, a reversible polyfunctional linker including a hindered secondary amino group and/or an aromatic hydroxy group, and one or more polymeric backbone components. The crosslinked backbone includes reversible urea or reversible urethane bonds
(Continued)

between the reversible polyfunctional linker and the polyisocyanate, which in turn provide self-healing properties to the omni-phobic composition. The self-healing omniphobic composition has favorable omniphobic properties, for example as characterized by water and/or oil contact and/or sliding angles. The omniphobic composition can be used as a coating on any of a variety of substrates to provide self-healing omniphobic properties to a surface of the substrate. Such self-healing omniphobic coatings can be scratch resistant, ink/paint resistant, and optically clear.

43 Claims, 8 Drawing Sheets

(51) Int. Cl.
*C08G 18/32* (2006.01)
*C09D 175/04* (2006.01)
*C09D 175/06* (2006.01)

(52) U.S. Cl.
CPC ........... *C08G 18/61* (2013.01); *C09D 175/04* (2013.01); *C09D 175/06* (2013.01)

(56) References Cited

U.S. PATENT DOCUMENTS

| | | |
|---|---|---|
| 7,153,568 B2 | 12/2006 | Suzuki et al. |
| 2004/0087759 A1 | 5/2004 | Malik et al. |
| 2006/0035091 A1 | 2/2006 | Bruchmann et al. |
| 2016/0032054 A1* | 2/2016 | Cheng ................... C08G 18/73 528/68 |
| 2016/0200937 A1 | 7/2016 | Hu et al. |
| 2017/0198154 A1 | 7/2017 | Gesford et al. |
| 2018/0009933 A1* | 1/2018 | Cheng ................ C08G 18/3228 |
| 2018/0022859 A1* | 1/2018 | Krüger ................. C08G 18/79 524/590 |
| 2018/0030269 A1 | 2/2018 | Kim et al. |
| 2018/0079850 A1 | 3/2018 | Tonelli et al. |
| 2019/0106544 A1* | 4/2019 | Bao ..................... C08G 77/452 |

OTHER PUBLICATIONS

"Dynamic urea bond for the design of reversible and self-healing polymers", Ying et al. Nature Communications 5:3218, pp. 1-9, 2014.*

Naveed et al., Dual-layer approach toward self-healing and self-cleaning polyurethane thermosets, Polymers, 11(11):1-12 (2019).

Cao et al., A thermal self-healing polyurethane thermoset based on phenolic urethane, Polymer Journal, pp. 1-7 (2017).

International Application No. PCT/US20/12011, International Search Report and Written Opinion, dated Mar. 31, 2020.

* cited by examiner

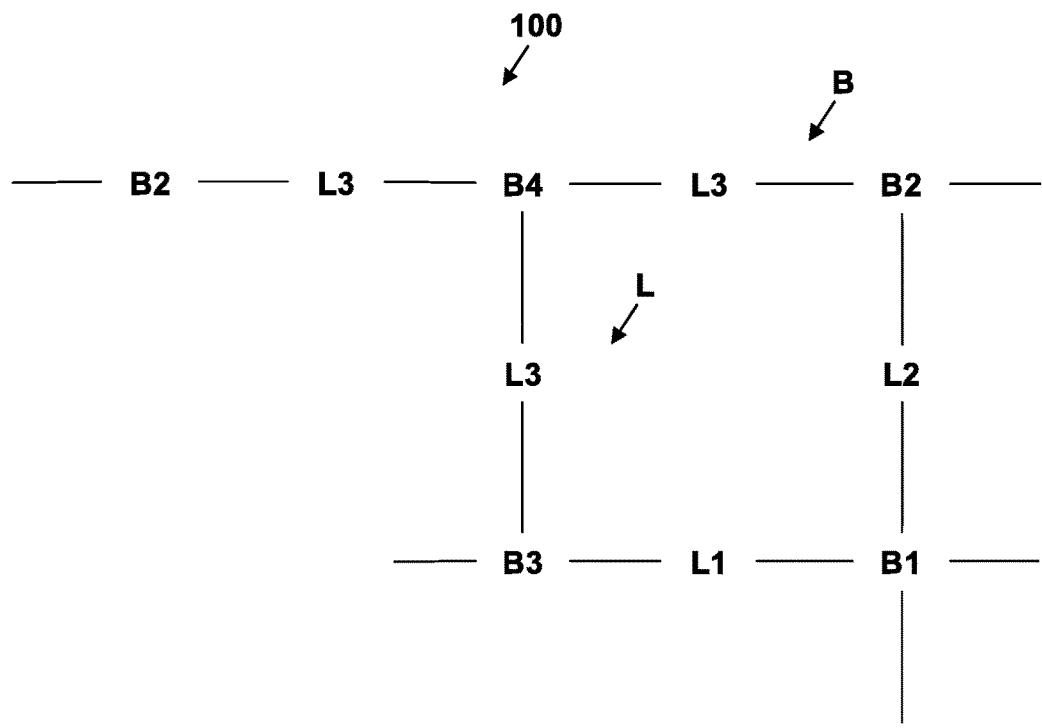
FIGURE 4
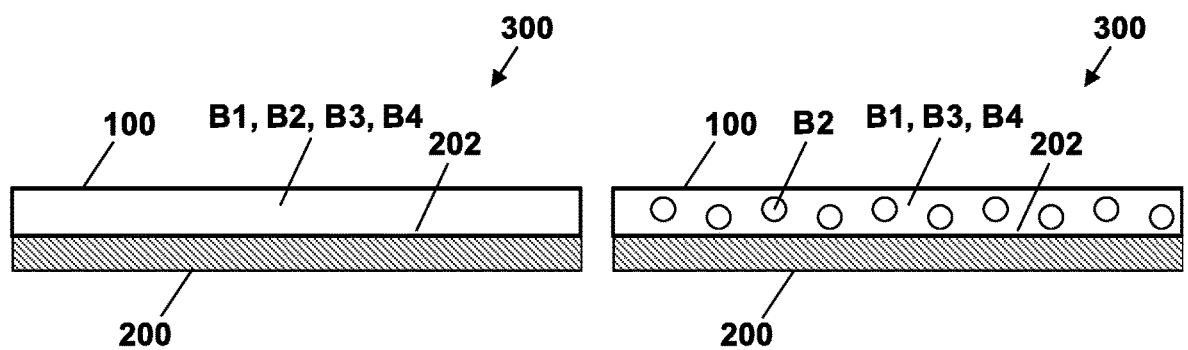
FIGURE 5
FIGURE 6

| Samples | Fresh cut | 40 °C(10 min) | 50 °C(10 min) | 60 °C(10 min) | 70 °C(10 min) |
|---|---|---|---|---|---|
| PU | | | | | |
| HDIT-PU | | | | | |
| HDIT-PU-PDMS5 | | | | | |
| HDIT-PU-PDMS10 | | | | | |
| HDIT-PU-PDMS20 | | | | | |
| HDIT-PU-PDMS40 | | | | | |
| HDIT-PU-PDMS60 | | | | | |

FIGURE 8

SELF-HEALING, SELF-CLEANING OMNIPHOBIC COMPOSITION, RELATED ARTICLES AND RELATED METHODS

CROSS-REFERENCE TO RELATED APPLICATIONS

This is a National Stage of International Application No. PCT/US20/12011, filed Jan. 2, 2020 (incorporated herein by reference in its entirety), which claims priority to U.S. Provisional Application No. 62/787,559 (filed Jan. 2, 2019), which is incorporated herein by reference in its entirety.

STATEMENT OF GOVERNMENT INTEREST

None.

BACKGROUND OF THE DISCLOSURE

Field of the Disclosure

The disclosure relates to a self-healing omniphobic composition including a self-healing omniphobic polymer with a crosslinked backbone. The crosslinked backbone includes a reaction product between a polyisocyanate, a functionalized omniphobic polymer reactive therewith, a reversible polyfunctional linker including a hindered secondary amino group and/or an aromatic hydroxy group, and one or more polymeric backbone components. The crosslinked backbone includes reversible urea or reversible urethane bonds between the reversible polyfunctional linker and the polyisocyanate, which in turn provide self-healing properties to the omniphobic composition.

Brief Description of Related Technology

When water accumulates on a surface, the surface energy of the material is directly related to how the water will react. Some surfaces may allow the water to spread out into a pool with a large surface area, whereas others may make water bead up into droplets. The contact angle between the water droplet and the surface is used to characterize the surface into three categories: hydrophilic)(<90°), hydrophobic)(90°-150°), and superhydrophobic)(>150°). FIG. 1 is a visual representation of a contact angle measurement.

Hydrophobicity can be achieved in two ways: controlling the chemical interactions between water and the material surface or altering the surface of the material. Generally, non-polar molecular groups are responsible water beading on a surface as opposed to spreading, due to the lower surface energies exhibited by non-polar groups. A lower surface energy of the material will directly relate to a high contact angle. In contrast, high-energy materials will cause water to spread out in a thin pool, as the polar groups present in surfaces with high energies attract the polar water molecules.

Physically altering the surface (e.g., increasing the roughness thereof) of the material may also increase the hydrophobicity of a material. By creating pillars or other similar features on a textured surface, water interacts with an increased surface area on the material, thus amplifying the chemical interactions between water and the surface. An image depicting how texturing the surface leads to increased contact angle can be seen below in FIG. 2.

A material that repels oils is known as oleophobic or lipophobic depending on if the repelling action is a physical or chemical property, respectively, and operates analogously to hydrophobic materials. These materials are often used on touch screen displays so that bodily oils and sweat gland secretions do not build up on the surface of a screen. A material that exhibits both hydrophobic and oleophobic properties is known as omniphobic. Such materials with very high contact angles are often regarded as "self-cleaning" materials, as contaminants will typically bead up and roll off the surface. As such, these materials have possible applications in screen display, window, and building material coatings.

Hu et al. U.S. Publication No. 2016/0200937 discloses polyurethane-based and epoxy-based compositions that be used as coatings and adhesives with abrasion-resistant, ink-resistant, anti-graffiti, anti-fingerprint properties. The disclosed process for making the compositions requires graft and block copolymer components along with a two-step/two-pot manufacturing process, increasing the time to manufacture and cost of the product.

Self-healing coatings heal or repair by themselves with or without the application of heat/radiation, thus saving repair costs. Consequently, these materials are highly attractive for industries. Self-healing coatings are achieved by several methods. Most of these methods rely on the encapsulation of a monomer or catalyst in the coating matrix so that the encapsulated components can be released into a crack of a damaged coating matrix and undergo in situ polymerization to fill the crack. While such approaches are highly interesting, they are typically challenging to scale up, have poor optical properties due to the presence of micron-size droplets or other dispersed phases (i.e., encapsulated active ingredients for repair purposes), and they only offer one-time repair due to the exhaustion of the encapsulated repairing regents.

SUMMARY

In one aspect, the disclosure relates to a self-healing omniphobic composition comprising: a self-healing omniphobic polymer comprising a crosslinked backbone, the crosslinked backbone comprising: (i) first backbone segments having a structure corresponding to at least one of a urethane reaction product and a urea reaction product from at least one polyisocyanate; (ii) second backbone segments having a structure corresponding to at least one of a urethane reaction product and a urea reaction product from at least one functionalized omniphobic polymer having a glass transition temperature ($T_g$) of 70° C. or less and comprising at least one of an amino functional group and a hydroxy functional group; (iii) third backbone segments having a structure corresponding to at least one of a urethane reaction product and a urea reaction product from at least one reversible polyfunctional linker comprising at least one of a hindered secondary amino group and an aromatic hydroxy group; (iv) fourth backbone segments; (v) first linking groups reversibly linking the first backbone segments and the third backbone segments, the first linking groups comprising at least one of (A) a reversible urea reaction product between the polyisocyanate and the hindered secondary amino group of the reversible polyfunctional linker and (B) a reversible urethane reaction product between the polyisocyanate and the aromatic hydroxy group of the reversible polyfunctional linker; (vi) second linking groups linking (e.g., irreversibly linking) the first backbone segments and the second backbone segments; and (vii) third linking groups linking (e.g., reversibly or irreversibly linking) the fourth backbone segments with at least one of the first backbone segments, the second backbone segments, and the third backbone segments. The functionalized omniphobic polymer can be an amino-functional hydrophobic polymer or a hydroxy-functional hydrophobic polymer such as PDMS. The reversible polyfunctional linker can be a di-, tri-, or higher functionality linker or crosslinker), for example having two, three, or more total amino/hydroxy groups for reaction with the polyisocyanate, where at least one of the amino/hydroxy groups in the reversible linker is the hindered secondary amino group or aromatic hydroxy group for reversible bond formation. The fourth backbone segments can be generally any reaction product of a monomeric, oligomeric, or polymeric component having di-, tri-, or higher reactive functionality with any of the first, second, or third backbone segments. The first linking groups can generally include dynamic/reversible urea and/or urethane bonds.

In another aspect, the disclosure relates to a self-healing omniphobic composition comprising: a self-healing omniphobic polymer comprising a crosslinked backbone, the crosslinked backbone comprising: (i) optionally first backbone segments having a structure corresponding to at least one of a urethane reaction product and a urea reaction product from at least one polyisocyanate; (ii) second backbone segments having a structure corresponding to at least one of a urethane reaction product and a urea reaction product from at least one functionalized omniphobic polymer having a glass transition temperature ($T_g$) of 70° C. or less and comprising at least one of an amino functional group and a hydroxy functional group; (iii) third backbone segments having a structure corresponding to at least one of a urethane reaction product and a urea reaction product from at least one reversible polyfunctional linker comprising at least one of a hindered secondary amino group and an aromatic hydroxy group; (iv) fourth backbone segments having a structure corresponding to at least one of a urethane reaction product and a urea reaction product from at least one polymeric polyisocyanate (e.g., polyurethane terminated/functionalized with isocyanate groups); (v) optionally first linking groups reversibly linking the first backbone segments and the third backbone segments (e.g., when first segments are present), the first linking groups comprising at least one of (A) a reversible urea reaction product between the polyisocyanate and the hindered secondary amino group of the reversible polyfunctional linker and (B) a reversible urethane reaction product between the polyisocyanate and the aromatic hydroxy group of the reversible polyfunctional linker; (vi) optionally second linking groups linking the first backbone segments and the second backbone segments (e.g., when first segments are present); and (vii) third linking groups linking the fourth backbone segments with the second backbone segments and the third backbone segments, the third linking groups comprising at least one of (A) a reversible urea reaction product between the polymeric polyisocyanate and the hindered secondary amino group of the reversible polyfunctional linker, (B) a reversible urethane reaction product between the polymeric polyisocyanate and the aromatic hydroxy group of the reversible polyfunctional linker, (C) a urea reaction product between the polymeric polyisocyanate and the amino group of the functionalized omniphobic polymer, (D) a urethane reaction product between the polymeric polyisocyanate and the aromatic hydroxy group of the functionalized omniphobic polymer.

The reversible urea reaction product generally corresponds to a urea reaction product in dynamic equilibrium between the isocyanate groups of the polyisocyanate forming the first backbone segments and the hindered secondary amino group of the reversible polyfunctional linker. The equilibrium is substantially shifted to the urea reaction product (e.g., at least 50%, 60%, 70%, 80%, 90% and/or up to 80%, 90%, 95%, 98%, 99, or 99.99% of isocyanate and 2° amino groups are in urea form), but at least some of the isocyanate and 2° amino groups are unreacted (e.g., at least 1%, 2%, 5%, 10%, or 20% and/or up to 20%, 30%, 40%, or 50% of isocyanate and 2° amino groups are unreacted), which unreacted groups exist due to the equilibrium between dynamic urea bond. The equilibrium is dynamic as a result of steric hindrance from the secondary amino group, resulting in a continuous breaking and reforming of the urea bonds between different isocyanate and 2° amino groups, even at normal use temperatures. Self-healing can be accelerated by heating a damaged omniphobic composition because it accelerates the equilibrium reaction (although it need not necessarily shift the equilibrium toward more or fewer urea groups) and softens the composition without melting or destroying it. A softened composition promotes polymer chains contact at a damaged interface between different regions of the composition, whereupon the dynamic urea bonds can re-form at the damaged interface to rejoin the separated portions of the composition.

The reversible urethane reaction product generally corresponds to a urethane reaction product between the isocyanate groups of the polyisocyanate forming the first backbone segments and the aromatic hydroxy group of the reversible polyfunctional linker. In contrast to the reversible urea bond, the reversible urethane bond need not be in equilibrium, dynamic or otherwise (e.g., substantially all of the isocyanate and aromatic hydroxy groups are in urethane form). The bond is reversible in that the application of heat to the composition can break the reversible urethane bond to re-form the isocyanate and aromatic hydroxy groups because of the ability of the aromatic group to which the hydroxy group is attached to delocalize and stabilize a negative charge when the urethane bond first breaks. Heating can also bring about an equilibrium state between the urethane, isocyanate, and aromatic hydroxy groups at the higher temperatures, but which equilibrium state did not exist at normal use temperatures. Self-healing can be thus effected by heating a damaged omniphobic composition because it breaks at least some urethane groups and softens the composition without melting or destroying it. A softened composition promotes contact at a damaged interface between different regions of the composition, whereupon the reversible urethane bonds can re-form at the damaged interface to rejoin the separated portions of the composition, which urethane bonds remain and continue to form as it cools.

The self-healing omniphobic polymer has a crosslinked backbone with a network structure of covalent bonds, which is characteristic of a thermoset polymer. Because of the presence of the reversible bonds, the omniphobic polymer can be additionally characterized as a reversible thermoset or vitrimer polymer that can flow similarly to a (viscoelastic) liquid at relatively high temperatures and that can behave as a conventional thermoset (solid) at relatively lower temperatures.

Various refinements of the disclosed self-healing omniphobic polymer are possible.

In a refinement, the reversible polyfunctional linker comprises at least two hindered secondary amino groups. The hindered secondary amino group generally has a structure of $R_1(NH)R_2G$. $R_1$ can generally include any sterically hindering group, for example a hydrocarbon or other group having from 1 to 18 carbon atoms (e.g., at least 1, 2, 3, 4 and/or up to 4, 6, 8, 10, 12, or 18 carbon atoms). For example, $R_1$ can be an alkyl or alkenyl (e.g., linear or branched), cycloalkyl or cycloalkenyl, or aromatic or heteroaromatic group (e.g., with 1, 2, or 3 N, O, S, or P heteroatoms in an aromatic structure with carbon atoms, such as a 5-, 6-, 7-, 8-, 9-, 10-, or higher membered ring). Specific examples for $R_1$ include $C_1$-$C_4$ alkyl, such as isopropyl, sec-butyl, and tert-butyl. Other examples for $R_1$ include aryl, $(C_1$-$C_{20})$alkyl, $(C_4$-$C_{10})$ cyclolalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, and $(C_2$-$C_{20})$alkyl-PEG-$(C_2$-$C_{20})$alkyl, with or without an intervening linking carbon between the foregoing groups and the —NH— group. The group —NH— corresponds to the secondary nitrogen atom/amino group. $R_2$ can generally include any linking group to at least one other amino or hydroxy group(s) G that is capable of reacting with the polyisocyanate to form a corresponding urea or urethane group, respectively, which urea or urethane group can be a reversible or irreversible. $R_2$ likewise can be an alkyl or alkenyl (e.g., linear or branched), cycloalkyl or cycloalkenyl, or aromatic or heteroaromatic group (e.g., with 1, 2, or 3 N, O, S, or P heteroatoms in an aromatic structure with carbon atoms). Specific examples for $R_2$ include $C_1$-$C_4$ alkylene, such as methylene, ethylene, propylene, and butylene. Other examples for $R_2$ include $(C_1$-$C_{100})$alkyl, $(C_1$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_1$-$C_{20})$alkyl$(C_6$-$C_{10})$aryl$(C_1$-$C_{20})$alkyl, $(C_2$-$C_{20})$alkyl-PEG-$(C_2$-$C_{20})$alkyl, $(C_1$-$C_{20})$alkylO$(C_1$-$C_{20})$alkyl, $(C_1$-$C_{20})$alkylS$(C_1$-$C_{20})$alkyl, —N($R_1$)—, =N—, —C(X)$_2$—(X is halo), —NC(=O)($C_1$-$C_{20})$alkyl, —C(=O)($C_1$-$C_{20})$alkyl-, —C(=O)—(NR$_1$)—, —S(=O)$_2$O—, —S(=O)$_2$—($C_1$-$C_{20})$alkyl-, —OS(=O)$_2$O ($C_1$-$C_{20})$alkyl-, —S(=O)$_2$NR$_1$—, —S(=O)($C_1$-$C_{20})$alkyl-, —P(=O)(OR$_1$)O—, —C(S)—($C_1$-$C_{20})$alkyl-, —C(=O)P ($C_1$-$C_{20})$alkyl-, —C(=O)O—, —C(=S)O($C_1$-$C_{20})$alkyl-, —C(=O)S($C_1$-$C_{20})$alkyl-, —C(=S)S($C_1$-$C_{20})$alkyl-, —C(=O)NR$_1$—($C_1$-$C_{20})$alkyl-, and —C(=NR$_1$)NR$_1$—. In the case where the reversible polyfunctional linker has two (e.g., only two) two hindered secondary amino groups, the structure can be represented by $R_1$(NH)$R_2$(NH)$R_3$, where $R_3$ is any sterically hindering group analogous to $R_1$, for example according to any of the above definitions for $R_1$, where $R_1$ and $R_3$ can be the same or different.

In a refinement, the reversible polyfunctional linker has one hindered secondary amino group (e.g., contains only one hindered secondary amino group). This can be represented by the general structure $R_1$(NH)$R_2$(NH$_2$) or $R_1$(NH) $R_2$(OH), where $R_1$ and $R_2$ can be as described above.

In a refinement, the reversible polyfunctional linker is selected from the group consisting of N,N'-di(t-butyl) ethylenediamine, N,N'-di(iso-propyl) ethylenediamine, N,N'-di (iso-butyl) ethylenediamine and combinations thereof. Additionally, hindered amine compounds carrying reactive groups such as hydroxyl can be used for reversible urea-urethane systems (e.g., 2,2,6,6-Tetramethyl-4-piperidinol).

In a refinement, the reversible polyfunctional linker comprises at least two aromatic hydroxy groups. The aromatic hydroxy group includes a hydroxy (OH) group bound directly to an aromatic or heteroaromatic group (e.g., with 1, 2, or 3 N, O, S, or P heteroatoms in an aromatic structure with carbon atoms, such as a 5-, 6-, 7-, 8-, 9-, 10-, or higher membered ring), for example including a phenolic group or hydroxyphenyl group. The aromatic hydroxy group can include multiple hydroxy groups bound to the same aromatic or heteroaromatic group (e.g., as in the case of a gallic acid derivative), for example where the polyfunctional linker has only one aromatic or heteroaromatic group but multiple hydroxy groups attached thereto for at least two aromatic hydroxy groups. In some other embodiments, the aromatic hydroxy group can include two or more aromatic or heteroaromatic groups linked together, each with one or more hydroxy groups attached thereto (e.g., such as for a bisphenol compound having two hydroxyphenyl groups).

In a refinement, the reversible polyfunctional linker has one aromatic hydroxy group (e.g., contains only one aromatic hydroxy group). This can be represented by the general structure (HO)AR$_2$(NH$_2$) or (HO)AR$_2$(OH), where A is an aromatic or heteroaromatic group as described above and $R_2$ can be as described above for the hindered amine.

In a refinement, the reversible polyfunctional linker is selected from the group consisting of gallic acid esters (e.g., propyl gallate), benzene diols (e.g., 1,4-benzenediol, 1,3-benzenediol, 1,2-benzenediol), halo-substituted benzene diols (e.g., 2-chloro-1,4-benzenediol), alkyl-substituted benzene diols (e.g., 2-methyl-1,4-benzenediol), bisphenols (e.g., bisphenol A, bisphenol F), ubiquiniol, genistein, gallic acid, pyrogailol, aloe emodin, poly(caffeic acid methyl ester), and combinations thereof. In certain cases, one or more hydroxy groups can be attached to a non-aromatic carbon and one or more hydroxy groups can be attached to an aromatic ring such as in polytyrosol.

In a refinement, the polyisocyanate comprises a diisocyanate.

In a refinement, the polyisocyanate comprises a triisocyanate. Suitably, the polyisocyanate is a tri- or higher functional isocyanate such that a functionalized hydrophobic polymer can react with the polyisocyanate monomer and still leave two or more isocyanate functional groups (e.g., on average and/or for at least some of the polyisocyanate monomers) for incorporation into the crosslinked polymer backbone, for example by reaction with the reversible polyfunctional linker of the third backbone segments and/or the monomeric, oligomeric, or polymeric component of the fourth backbone segments.

In a refinement, the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

In a refinement, the functionalized omniphobic polymer comprises the amino functional group (e.g., mono-, di-, or higher amino-functional hydrophobic polymer such as PDMS forming the basis of the second backbone segments). In another refinement, the functionalized omniphobic polymer comprises the hydroxy functional group (e.g., mono-, di-, or higher hydroxy-functional hydrophobic polymer such as PDMS forming the basis of the second backbone segments). In an alternative embodiment, the functionalized omniphobic polymer comprises an epoxide functional group (e.g., mono-, di-, or higher epoxide-functional hydrophobic polymer such as PDMS forming the basis of the second backbone segments). Several specific functionalized omniphobic polymer functional groups and their complementary groups in the polyisocyanate of the first backbone segments and/or the components forming the fourth backbone segments are illustrated as follows. Amino groups in the functionalized omniphobic polymer can react with isocyanate groups in the first or fourth segment components to make a urea link, such as in a polyurethane. Amino groups in the functionalized omniphobic polymer can react with epoxide groups in the fourth segment components to make beta-hydroxy tertiary amine links, such as in an epoxy polymer. The term "beta-hydroxy amine" generally refers a structure in which the hydroxy group is attached to the beta carbon, which is attached to the alpha-carbon, which is directly attached to the nitrogen atom of the reacted amine. The beta-hydroxy amine can be represented by the structure —CH(OH)—CH$_2$—NR$_1$—R$_2$ in the cured epoxy polymer, where R$_1$ and R$_2$ can be another beta-hydroxy group or the remainder of the reactive amine component. Amino groups in the functionalized omniphobic polymer can react with carboxylic groups in the fourth segment components to make an amide link, such as in an acrylic polymer. Hydroxyl groups in the functionalized omniphobic polymer can react with isocyanate groups in the first or fourth segment components to make a urethane link, such as in a polyurethane. Hydroxyl groups in the functionalized omniphobic polymer can react with carboxylic groups in the fourth segment components to make an ester link, such as in an acrylic polymer. Epoxide groups in the functionalized omniphobic polymer can react with amino groups in the polyfunctional linker or fourth segment components (e.g., and not necessarily the first segment polyisocyanate components) to make beta-hydroxy tertiary amine links, such as in an epoxy polymer.

In a refinement, the functionalized omniphobic polymer is selected from the group consisting of functionalized polysiloxanes, functionalized polyperfluoroethers, functionalized polybutadienes, functionalized polyisobutenes ("PI B"), functionalized branched polyolefins, functionalized low molecular weight polyolefins, functionalized poly(meth) acrylates (e.g., also including C$_2$-C$_{16}$ pendant alkyl groups), and combinations thereof. In a further refinement, the functionalized omniphobic polymer can be used in combination with a low melting point (e.g., melting point from 0-60° C.) hydrophilic polymer/oligomer such as amine-functional poly(ethylene glycol) methyl ether ("PEO"). The functionalized omniphobic polymers additionally can include block copolymers (e.g., PDMS-PEG-hydroxy, PDMS-PEG-amino, polyperfluoroether-PEG-hydroxy, polyperfluoroether-PEG-amino) and/or graft copolymers (e.g., PDMS-graft-PEG-hydroxy, PDMS-graft-PEG-amino, polyperfluoroether-graft-PEG-hydroxy, polyperfluoroether-graft-PEG-amino, PDMS-graft-diol, PDMS-graft-polyphenols, etc.) of the foregoing.

In a refinement, the functionalized omniphobic polymer comprises a mono-functional functionalized omniphobic polymer (e.g., having only a single functional group reactive with the first and/or fourth segment components, such as at a terminal location of the omniphobic polymer; such as a mono-functional polysiloxane).

In a refinement, the functionalized omniphobic polymer comprises a di-functional functionalized omniphobic polymer (e.g., having only two functional groups reactive with the first and/or fourth segment components, such as at terminal locations of the omniphobic polymer; such as a di-functional polysiloxane).

In a refinement, the functionalized omniphobic polymer comprises a poly-functional functionalized omniphobic polymer (e.g., having three, four, or more functional groups reactive with the first and/or fourth segment components, such as at terminal locations of the omniphobic polymer and/or as pendant groups along the backbone of the omniphobic polymer; such as a poly-functional polysiloxane).

In a refinement, the functionalized omniphobic polymer is a liquid at a temperature in a range from −150° C. to 70° C., −150° C. to 50° C., or from −130° C. to 40° C. In various embodiments, the functionalized omniphobic polymer is a liquid at a temperature in a range from 10° C. to 40° C. (e.g., from 20° C. to 30° C., or about room temperature, such as where the functionalized omniphobic polymer has a melting temperature ($T_m$) below 10° C. or 20° C.). The functional groups of the functionalized omniphobic polymer can be terminal and/or pendant from the polymer.

In a refinement, the functionalized omniphobic polymer has a molecular weight ranging from 300 to 50,000 g/mol. The functionalized omniphobic polymer can have any suitable molecular weight in view of desired glass transition temperature, for example having a molecular weight ranging from 300 to 50,000 g/mol. In various embodiment, the molecular weight can be at least 300, 800, 1000, 1500, or 2000 and/or up to 1000, 2000, 3000, 5000, or 50,000 g/mol. The molecular weight can be expressed as a number-average or weight-average value in the units of gram/mole (g/mol). Some embodiments can include a blend of two or more functionalized omniphobic polymers with different average molecular weights, such as one with 300-1500 g/mol and another with 1500-50,000 g/mol with a higher average molecular weight than the first. Blends of functionalized omniphobic polymers (e.g., differing in molecular weight and/or in degree of functionality) can improve the combination of water- and oil-repellency properties of the final composition. For example, a mono-functionalized polysiloxane can provide better water and oil repellency than a di-functionalized polysiloxane. Low MW functionalized polysiloxanes (e.g., PDMS, such as having a MW range of about 800-1200 g/mol or an average MW of about 1000 g/mol) can provide an improved water repellency, while Higher MW functionalized polysiloxanes (e.g., PDMS, such as about 2000 g/mol or above for an average or range of MW) can provide an improved oil repellency.

In a refinement, the fourth backbone segments have a structure corresponding to a reaction product of a polyurethane comprising two or more functional groups reactive with one or more of the polyisocyanate, the functionalized omniphobic polymer, and the reversible polyfunctional linker. In a particular refinement, the polyurethane comprises two or more isocyanate groups as the functional groups. The polyurethane can be an oligomeric or polymeric polyurethane prepolymer, for example a linear polyurethane prepolymer. In some embodiments, the polyurethane has two (e.g., only two) functional groups reactive with the other omniphobic polymer components, for example at opposing terminal ends of the polyurethane (e.g., for a linear polyurethane). An example reactive functional group can include isocyanate, for example a diisocyanate-terminated polyurethane, which then can react with the functionalized omniphobic polymer, and the reversible polyfunctional linker to form the final omniphobic polymer. In such case, the bonds formed with the reversible polyfunctional linker also could be reversible urea or urethane bonds (e.g., as with the polyisocyanate of the first backbone segment). Another example reactive functional group can include hydroxy, for example a dihydroxy-terminated polyurethane, which then can react with the polyisocyanate to form the final omniphobic polymer.

In a refinement, the fourth backbone segments have a structure corresponding to a reaction product of a polyepoxide comprising two or more epoxide functional groups reactive with one or more of the functionalized omniphobic polymer and the reversible polyfunctional linker. The polyepoxide can be a monomeric, oligomeric, or polymeric di- or higher epoxide, for example a linear oligomeric or polymeric prepolymer with two or more epoxy groups. The epoxide functional group can react with hindered secondary amines to form linear oligomers and polymers such that having sec-amine on both ends of these oligomers and polymers, which are then crosslinked by reversible urea bond by reacting with a polyfunctional isocyanate and functionalized omniphobic polymer (e.g., amino-PDMS).

In a particular refinement, the polyepoxide is selected from the group consisting of polyepoxide-substituted aromatic hydrocarbons, aliphatic hydrocarbons, cycloaliphatic hydrocarbons, ethers thereof, esters thereof, imines thereof, and combinations thereof. The polyepoxide can include hydrocarbons with two or more epoxide groups and one or more aromatic, aliphatic, cycloaliphatic, ether, ester, and/or imine groups in the hydrocarbon to which the epoxide groups are attached.

In a refinement, the first backbone segments (e.g., HDIT-based segments) are present in the omniphobic polymer in an amount ranging from 0.05 wt. % to 20 wt. % relative to the omniphobic polymer. A particularly suitable range is 1 wt. % to 10 wt. % in the case of the hindered amine reversible linker; and 0.05 wt. % to 10 wt. % in the case of the aromatic hydroxy reversible linker. More generally, the first backbone segments can be present in an amount ranging from 0.05 wt. % to 20 wt. % relative to the omniphobic composition (e.g., at least 0.05, 0.1, 0.2, 0.5, 1, 2, 3, or 5 wt. % and/or up to 3, 5, 8, 10, 15 or 20 wt. %; such as 0.05 wt. % to 10 wt. %, 1 wt. % to 10 wt. %, 0.5 wt. % to 5 wt. %, or 1 wt. % to 5 wt. %).

In a refinement, the second backbone segments (e.g., amino-functional PDMS-based segments) are present in the omniphobic polymer in an amount ranging from 0.01 wt. % or 0.05 wt. % to 20 wt. % relative to the omniphobic polymer. A particularly suitable range is 0.5 wt. % to 5 wt. %. More generally, the second backbone segments can be present in an amount ranging from 0.05 wt. % to 20 wt. % relative to the omniphobic composition (e.g., at least 0.01, 0.05, 0.1, 0.2, 0.5, 1, 2, 3, or 5 wt. % and/or up to 3, 5, 8, 10, 15 or 20 wt. %; such as 0.2 wt. % to 8 wt. %, 0.5 wt. % to 5 wt. %, or 1 wt. % to 5 wt. %).

In a refinement, the third backbone segments (e.g., hindered amine- or aromatic hydroxy-based segments) are present in the omniphobic polymer in an amount ranging from 2 wt. % to 80 wt. % relative to the omniphobic polymer. A particularly suitable range is 5 wt. % to 30 wt. %. More generally, the third backbone segments can be present in an amount ranging from 2 wt. % to 80 wt. % relative to the omniphobic composition (e.g., at least 2, 5, 10, 15, or 20 wt. % and/or up to 30, 40, 50, 60, 70, or 80 wt. %; such as 20 wt. % to 60 wt. %).

In a refinement, the fourth backbone segments (e.g., polyurethane- or polyepoxide-based segments) are present in the omniphobic polymer in an amount ranging from 10 wt. % to 90 wt. % relative to the omniphobic polymer. More generally, the fourth backbone segments can be present in an amount ranging from 10 wt. % to 90 wt. % relative to the omniphobic composition (e.g., at least 10, 15, or 20 wt. % and/or up to 30, 40, 50, 60, 70, 80, or 90 wt. %; such as 30 wt. % to 70 wt. %).

In a refinement, the second backbone segments (e.g., amino-functional PDMS-based segments) relative to the first backbone segments (e.g., HDIT-based segments) are present in the omniphobic polymer in an amount ranging from 1:2 to 1:100 (i.e., a stoichiometric excess of the components forming the first backbone segments relative to the components forming the second backbone segments). More generally, the ratio can be at least 1:2, 1:3, 1:4, 1:5, or 1:10 and/or up to 1:5, 1:10, 1:20, 1:30, 1:40, 1:50, or 1:100.

The foregoing ranges can apply as well to the relative weight amounts of the polyisocyanate (i.e., first backbone segment component), the functionalized omniphobic polymer (i.e., second backbone segment component), the reversible polyfunctional linker (i.e., third backbone segment component), and the fourth backbone segment component relative to the total weight amount of the four components before crosslinking reactions and/or relative to all monomeric, oligomeric, and polymeric reaction components added thereto.

In a refinement, the self-healing omniphobic composition further comprises one or more additives selected from the group consisting of nanoclay, graphene oxide, graphene, graphite (e.g., ground), silicon dioxide (silica), aluminum oxide, cellulose nanocrystals, carbon nanotubes, zirconia, titanium dioxide (titania), diatomaceous earth, biocides, pigments, dyes, thermoplastics, low and high molecular weight poly(ethylene oxide), salts (e.g., tetra alkyl ammonium), non-ionic ingredients (e.g., non-surfactants such as TWEEN or polysorbate 80, TWEEN or polysorbate 85), polyhedral oligomeric silsesquioxane (POSS) and POSS derivatives, functional agents (e.g., antistatic agents, UV blockers) and combinations thereof. The additives can be nano-scale (nanofillers) or micro-scale (microfillers). The additives can be included in the coating composition in a range from 0.5 to 40 wt. %, for example at least 0.5, 1, 2, 5, 7, or 10 wt. % and/or up to 5, 10, 15, 20, 30, or 40 wt. %. The additives can improve thermal conductivity of the corresponding coating to promote (or at least not substantially impede) heat transfer between the inner fluid and outer environment to be cooled, for example including graphene oxide, (ground) graphite, etc. The additives can improve the mechanical properties of the corresponding coating, such as wear-resistance, for example for coatings including zirconia, silica, titania, etc.

In a refinement, the self-healing omniphobic composition (e.g., in the form of a coating) has a water contact angle in a range from 90° to 120°. In a refinement, the self-healing omniphobic composition (e.g., in the form of a coating) has an oil contact angle in a range from 1° to 65°. In a refinement, the self-healing omniphobic composition (e.g., in the form of a coating) has a water sliding angle in a range from 1° to 30° for a 75 µl droplet. In a refinement, the self-healing omniphobic composition (e.g., in the form of a coating) has an oil sliding angle in a range from 1° to 20° for a 25 µl droplet.

More generally, the omniphobic properties of the self-healing omniphobic composition or corresponding coating (e.g., for the cured composition, such as on a substrate) can be characterized in terms of one or more contact angles and/or sliding angles for water and/or oil droplets (e.g., vegetable oil and/or hexadecane) on the self-healing coating (e.g., as a coating on a substrate). The following ranges are representative of compositions and coatings according to the disclosure which display favorable omniphobic properties. In an embodiment, the composition or coating has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the composition or coating has an oil contact angle in a range from 0° or 1° to 65° (e.g., at least 1°, 10°, 20°, or 30° and/or up to 40°, 50°, 60°, or 65°; such as for the cured composition as a coating). In an embodiment, the composition or coating has a water sliding angle in a range from 0° or 1° to 30° for a 75 µl droplet (e.g., at least 1°, 2°, 4°, 6°, or 8° and/or up to 10°, 15°, 20°, or 30°; such as for the cured composition as a coating). In an embodiment, the composition or coating has an oil sliding angle in a range from 0° or 1° to 20° for a 25 µl droplet (e.g., at least 1°, 2°, 4°, 6°, or 8° and/or up to 10°, 12°, 15°, or 20°; such as for the cured composition as a coating). The contact angles for the omniphobic composition or coating can be higher when nanofillers (e.g., clay, silica, etc.) are included in the composition as compared to a corresponding composition without any nanofillers. For example, in the case of compositions or coatings further including one or more nanofillers (e.g., nanoclay, graphene oxide, graphene, silicon dioxide (silica), aluminum oxide, cellulose nanocrystals, carbon nanotubes, titanium dioxide), the contact angles suitably can range from 100° to 150° for water, and from 20° to 120° for oil. Similarly, the sliding angles for water on the surface of nanofiller-containing compositions or coatings can range from 0° or 1° to 20° for a 25 µl droplet.

In a refinement, the self-healing omniphobic composition has a homogeneous structure.

In a refinement, the self-healing omniphobic composition has a heterogeneous structure, for example a composite structure with one or more additives or nanofillers distributed throughout the omniphobic composition.

In a refinement, the self-healing omniphobic composition has a composite structure comprising: (i) a solid matrix comprising the first backbone segments, the third backbone segments, and the fourth backbone segments; and (ii) liquid nanodomains comprising the second backbone segments; and (ii) liquid nanodomains comprising the second backbone segments; the liquid nanodomains have a size of 80 nm or less (e.g., average size, such as 80 nm or 50 nm or less; size ranging from 1 nm to 40 nm); and the liquid nanodomains are (i) distributed throughout the solid matrix or (ii) substantially only occupy a thin surface layer (e.g., 5, 10, 15, or 20 nm thick; top or exposed layer when applied to a substrate). In the lower limit as the nanodomain size goes to zero, the self-healing omniphobic composition becomes a homogeneous structure.

In another aspect, the disclosure relates to a coated article comprising: (a) a substrate; and (b) a self-healing omniphobic composition according to any of the variously disclosed embodiments, coated on a surface of the substrate.

Various refinements of the disclosed coated article are possible.

In a refinement, the substrate is selected from the group of metal, plastics, a different thermoset material, glass, wood, fabric (or textile), cellulose, lignocellulose, and ceramics. In another refinement, the substrate comprises a metal selected from aluminum, copper (e.g., bronze alloy with tin, brass alloy with zinc), steel (e.g., stainless steel), alloys thereof, and combinations thereof. The substrate is not particularly limited, and generally can be formed from any material desired for protection with an omniphobic coating, in particular given the good, broad adhesive capabilities of the omniphobic composition. For example, the substrate can be a metal, plastic, a different thermoset material (e.g., a primer material; material other than the self-healing omniphobic composition), glass, wood, fabric (or textile), or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), starch, chitosan, etc. Suitable wood materials can be any type of wood commonly used in home, office, and outdoor settings. Suitable glass materials can be those used for building windows, automobile windows, etc. In some embodiments, the substrate is a top layer of a coating or series of coatings on a different underlying substrate. For example, the coated article can include a substrate material as generally disclosed herein, one or more intermediate coatings on the substrate (e.g., an epoxy coating, an acrylic coating, another primer coating, etc.), and the omniphobic composition on the one or more intermediate coatings as the final, external coating on the coated article.

In a refinement, the self-healing omniphobic composition has a thickness ranging from 0.01 µm to 100 µm or 500 µm, in particular from 10 µm to 50 µm. More generally, the self-healing omniphobic coating can have any desired thickness on the substrate. In common applications, the coating has a thickness ranging from 0.010 µm to 100 µm or 500 µm, for example at least 0.01, 10, 20, 50, or 100 µm and/or up to 200, 500 µm. Typical cast coatings can have thicknesses of 10 µm to 50 µm or 100 µm. Typical spin coatings can have thicknesses of 0.05 µm or 0.10 µm to 0.20 µm or 0.50 µm. Multiple coating layers can be applied to substrate to form even thicker layers of the composition (e.g., above 500 µm or otherwise) if desired.

In a refinement, the self-healing omniphobic composition coating is scratch-resistant, ink-resistant, and optically clear. For example, the coating can have a scratch resistance value of 7-10, 8-10, 9-10, or 10 as evaluated by the "Scratch Resistance" method described below. Similarly, the coating can have an ink resistance value of 7-10, 8-10, 9-10, or 10 as evaluated by the "Permanent Ink Resistance" method described below.

In another aspect, the disclosure relates to a method for forming a self-healing omniphobic composition, the method comprising: (a) reacting (i) at least one polyisocyanate, (ii) at least one functionalized omniphobic polymer having a glass transition temperature ($T_g$) of 70° C. or less and comprising at least one of an amino functional group and a hydroxy functional group, (iii) at least one reversible polyfunctional linker comprising at least one of a hindered secondary amino group and an aromatic hydroxy group, and (iv) at least one fourth component (e.g., monomeric, oligomeric, or polymeric component) having at least di-reactive functionality with at least one of the polyisocyanate, the functionalized omniphobic polymer, and the reversible polyfunctional linker, to form a partially crosslinked reaction product; and (b) curing the partially crosslinked reaction product to form the self-healing omniphobic composition.

The first, second, third, and fourth components can be combined in any desired order, for example by at least partially pre-reacting a subset of the components before adding remaining components to form the partially crosslinked reaction product. In some illustrative embodiments, the first (e.g., HDIT), second (e.g., amino-PDMS), and third (e.g., hindered amine linker) components are combined and pre-reacted, and then the fourth (e.g., PU-NCO) and further first components are added to form the partially crosslinked reaction product. In some illustrative embodiments, the first (e.g., HDIT), third (e.g., hydroxy aromatic linker), and fourth (e.g., PU-NCO) components are combined and pre-reacted, and then the second (e.g., amino-PDMS) component is added to form the partially crosslinked reaction product. In some illustrative embodiments, the third (e.g., hindered amine linker) and fourth (e.g., BPA-diepoxide) components are combined and pre-reacted, and then the first (e.g., HDIT) and second (e.g., amino-PDMS) components are added to form the partially crosslinked reaction product. In some embodiments, at least some of the first (e.g., HDIT) and second (e.g., amino-PDMS) components are separately combined and pre-reacted before adding to other reaction components to form the partially crosslinked reaction product. This step of separately reacting the first and second components can help to ensure that the second component is relatively evenly reacted with and distributed among the first component to provide sufficient remaining isocyanate reactivity on the first component for reaction with the third and/or fourth components. In some illustrative embodiments, the first (e.g., HDIT), third (e.g., hindered amine or hydroxy aromatic linker), and fourth (e.g., PU-NCO) components are combined, cast on a substrate, and then allowed to partially crosslink the coating. The second (e.g., amino-PDMS) component is then added as a surface layer (e.g., via dipping, spraying, roller brush, or drop cast methods) to the partially crosslinked coating, where it can react with at least one of the other three components in a surface layer to form the partially crosslinked reaction product.

Various refinements of the disclosed method for forming a self-healing omniphobic composition are possible.

In a refinement, the method comprises reacting the at least one polyisocyanate, the at least one functionalized omniphobic polymer, the at least one reversible polyfunctional linker, and the at least one fourth component to form the partially crosslinked reaction product (i) at temperature from 0° C. to 150° C. or 20° C. to 100° C. (e.g., at least 0° C., 20° C., 40° C., or 60° C. and/or up to 20° C., 30° C., 40° C., 60° C., 80° C., 100° C., or 150° C.) and (ii) for a time from 1 min to 300 min or 5 min to 300 min (e.g., 1, 2, 5, or 10 min to 20, 40, 60, 120, or 300 min). The reaction can be performed with or without heating the reaction mixture. Room-temperature (e.g., 20° C. to 30° C.) reactions are possible with longer reaction times and/or the addition of a catalyst.

In a refinement, the method comprises curing the partially crosslinked reaction product to form the omniphobic composition (i) at temperature from 20° C. to 30° C. and (ii) for a time from 1 min to 260 hr or 4 hr to 400 hr.

In a refinement, the method comprises curing the partially crosslinked reaction product to form the omniphobic composition (i) at temperature from 20° C. to 150° C. (e.g., at least 0° C., 20° C., 40° C., or 60° C. and/or up to 20° C., 30° C., 40° C., 60° C., 80° C., 100° C., or 150° C.) and (ii) for a time from 1 min to 300 min or 5 min to 300 min (e.g., 1, 2, 5, or 10 min to 20, 40, 60, 120, or 300 min).

In a refinement, the method comprises reacting the at least one polyisocyanate, the at least one functionalized omniphobic polymer, the at least one reversible polyfunctional linker, and the at least one fourth component to form the partially crosslinked reaction product in a reaction solvent comprising one or more of a ketone, an ester, dimethyl formamide, and dimethyl carbonate.

In a refinement, the method comprises mixing while reacting the at least one polyisocyanate, the at least one functionalized omniphobic polymer, the at least one reversible polyfunctional linker, and the at least one fourth component to form the partially crosslinked reaction product.

In a refinement, the method further comprises adding to the components (i), (ii), and (iii) one or more additives, for example selected from the group consisting of nanoclay, graphene oxide, graphene, graphite, silicon dioxide (silica), aluminum oxide, cellulose nanocrystals, carbon nanotubes, zirconia, titanium dioxide (titania), diatomaceous earth, biocides, pigments, dyes, thermoplastics, and combinations thereof. The additives are thus incorporated into the polymeric matrix upon formation of the partially crosslinked reaction product and the eventual self-healing omniphobic composition coating.

In a refinement, curing the partially crosslinked reaction product to form the self-healing omniphobic composition comprises: adding a casting solvent to the partially crosslinked reaction product; applying the casting solvent and the partially crosslinked reaction product to a substrate; drying the substrate to remove the casting solvent, thereby forming a coating of the partially crosslinked reaction product on the substrate; and curing the coating of the partially crosslinked reaction product on the substrate, thereby forming a coating of the self-healing omniphobic composition on the substrate. In a further refinement, the method comprises performing one or more of spraying, casting, rolling, and dipping to apply the casting solvent and the partially crosslinked reaction product to the substrate.

In a refinement, curing the partially crosslinked reaction product to form the self-healing omniphobic composition comprises: applying the partially crosslinked reaction product to a substrate; drying the substrate, thereby forming a coating of the partially crosslinked reaction product on the substrate; and curing the coating of the partially crosslinked reaction product on the substrate, thereby forming a coating of the self-healing omniphobic composition on the substrate. In a further refinement, the method comprises performing one or more of spraying, casting, rolling, and dipping to apply the partially crosslinked reaction product to the substrate.

In a refinement, the method comprises reacting the at least one polyisocyanate, the at least one functionalized omniphobic polymer, the at least one reversible polyfunctional linker, and the at least one fourth component to form the partially crosslinked reaction product in a reaction solvent; applying the partially crosslinked reaction product in the reaction solvent to a substrate; and drying the substrate, thereby removing at least some of the reaction solvent and forming a coating of the partially crosslinked reaction product on the substrate.

In another aspect, the disclosure relates to a method for repairing a self-healing omniphobic composition, the method comprising: (a) providing a self-healing omniphobic composition or a coated article comprising a self-healing omniphobic composition according to any of the variously disclosed embodiments, wherein the self-healing omniphobic polymer has at least one instance of surface damage; and (b) heating the surface-damaged self-healing omniphobic composition for a time sufficient and at a temperature sufficient to at least partially repair the at least one instance of surface damage by at least partially rejoining separated surfaces and at least partially reforming first linking groups at the rejoined separated surfaces. The repair of the damaged surface can be essentially complete such that there is no remaining outward visual indication of the original surface damage after repair. An optical microscope along a scale can be used to observe and measure the degree of healing and recovery, for example can by measuring cut width before and after healing.

Various refinements of the disclosed method for repairing a self-healing omniphobic composition are possible.

In a refinement, the at least one instance of surface damage is selected from the group consisting of cuts, punctures, dents, scratches, and combinations thereof. Suitably, a cut or puncture should be less than about 1 mm in width or diameter, otherwise the damage could be too severe to repair via the self-healing mechanism. For example, the cut or puncture can have an initial width or diameter of at least 0.01, 0.1, 1, 10, 20, 50, or 100 μm and/or up to 1, 10, 20, 50, 100, 200, 500, or 1000 μm and be successfully repaired. The length of the corresponding cut is not particularly limited and can have any value (i.e., with the lesser (width) dimension of the damage being the limiting factor). Similarly, a scratch should be less than about 10 mm in width or diameter, otherwise the damage could be too severe to repair via the self-healing mechanism. For example, the scratch can have an initial width or diameter of at least 0.01, 0.1, 1, 10, 20, 50, 100, or 1000 μm and/or up to 1, 10, 20, 50, 100, 200, 500, 1000, 2000, 5000, or 10000 μm and be successfully repaired. The length of the corresponding scratch is not particularly limited and can have any value (i.e., with the lesser (width) dimension of the damage being the limiting factor). For any of the various damage types, the depth of the surface damage is not particularly limited and can have any value.

In a refinement, the method comprises heating the surface-damaged self-healing omniphobic composition for a time in a range from 1 min to 72 hours (e.g., 5 min to 30 min, 6 hr, or 24 hr). For example, suitable heating times can be at least 1, 2, 5, 10, 30, 60, or 120 min and/or up to 0.2, 0.5, 1, 2, 4, 6, 12, 24, 48, or 72 hr.

In a refinement, the method comprises heating the surface-damaged self-healing omniphobic composition at a temperature in a range from 18° C. to 150° C. In some cases, the temperature sufficient for repair can include ambient temperatures, for example heating or otherwise exposing the damaged omniphobic composition to a temperature of at least 18, 20, or 25° C. and/or up to 20, 25, or 30° C. When heating to elevated temperatures above ambient conditions, suitable temperatures can include at least 40, 60, 80, or 100° C. and/or up to 60, 80, 100, or 120° C. For compositions including reversible urea bonds, particularly suitable temperatures can range from 18° C.-40° C. for relatively short treatment times (e.g., up to about 10 min). For compositions including reversible urethane bonds, particularly suitable temperatures can range from 100° C.-120° C. for relatively short treatment times (e.g., up to about 10 min).

While the disclosed compositions, articles, methods, and apparatus, are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein:

FIG. 4 illustrates a self-healing omniphobic composition according to another embodiment of the disclosure.

FIG. 5 illustrates a coated article according to the disclosure in which the self-healing omniphobic composition has a homogeneous structure.

FIG. 6 illustrates a coated article according to the disclosure in which the self-healing omniphobic composition has a composite structure.

FIG. 8 includes photographs illustrating self-healing behavior for coating compositions according to an aspect of the disclosure.

DETAILED DESCRIPTION

Figure 1:
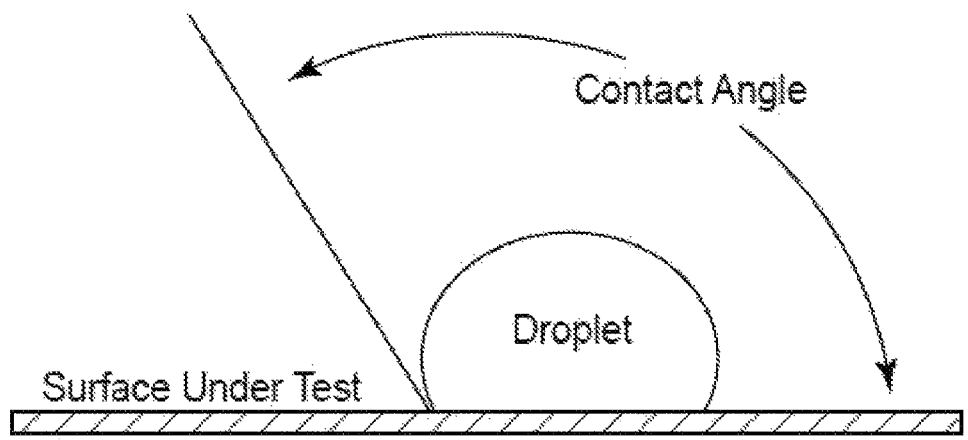
FIG. 1 is a diagram illustrating measurement of a contact angle for a liquid droplet on a surface.
Figure 2:
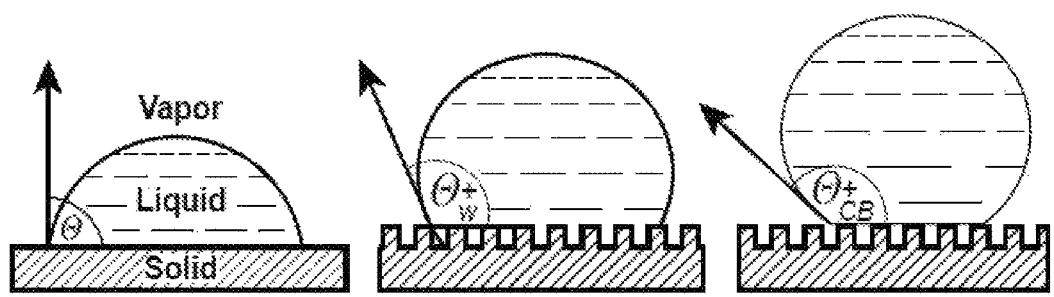
FIG. 2 is a diagram illustrating how contact angles for a given liquid droplet on a surface can vary as a function of surface topology (e.g., flat or smooth surface vs. textured surfaces).

The disclosure relates to a self-healing omniphobic composition including a self-healing omniphobic polymer with a crosslinked backbone. The crosslinked backbone includes a reaction product between a polyisocyanate, a functionalized omniphobic polymer reactive therewith, a reversible polyfunctional linker including a hindered secondary amino group and/or an aromatic hydroxy group, and one or more polymeric backbone components. The crosslinked backbone includes reversible urea or reversible urethane bonds between the reversible polyfunctional linker and the polyisocyanate, which in turn provide self-healing properties to the omniphobic composition. The self-healing omniphobic composition has favorable omniphobic properties, for example as characterized by water and/or oil contact and/or sliding angles. The omniphobic composition can be used as a coating on any of a variety of substrates to provide self-healing omniphobic properties to a surface of the substrate. Such self-healing omniphobic coatings can be scratch resistant, ink/paint resistant, and optically clear. The self-healing omniphobic composition can be applied by different coating methods including cast, spin, roll, spray and dip coating methods.

The disclosure relates to self-healing omniphobic compositions and coatings. As discussed above, conventional self-healing coatings can incorporate encapsulated active ingredients for repair purposes, but such approaches generally have poor optical properties (e.g., being cloudy, hazy, or otherwise optically unclear) and have a limited number of repair cycles due to consumption of active the repair ingredients (e.g., being repairable only once in a given spatial location of the composition). In contrast, the disclosure provides a relatively simpler and more practical approach that yields optically clear coatings with the incorporation of reversible covalent bonds into the polymer backbone (e.g., thermal- or light-reversible covalent bonds). The disclosed compositions can be quickly and repeatedly repaired under relatively mild self-healing conditions, for example at healing temperatures as low as about 40° C. and healing times as low as about 10 minutes in some embodiments or at ambient temperature conditions for longer times in other embodiments (e.g., with higher healing temperatures and/or healing times being possible). Further, the disclosed compositions have self-cleaning properties, which offer protection against solvents/chemicals that interact with a coating. Such self-healing, self-cleaning coatings are useful for smudge-free touchscreen devices, self-cleaning windows for skyscrapers, anti-biofouling coatings for ships, corrosion-free metallic surfaces, stain-free fabrics, anti-ice cables, anti-microbial surfaces, chemical resistant shields, as well as performance enhancers in microfluidic devices.

In an embodiment and as illustrated in the examples below, the disclosure relates to a self-healing, self-cleaning polyurethane coating. The polyurethane coating was prepared under ambient conditions. A suitable combination of urethane diisocyanate prepolymer, polyisocyanate crosslinkers, hindered amine reversible crosslinkers, appropriate solvents and the use of reactive groups on a polydimethylsiloxane omniphobic polymer provided an optically clear film, with excellent water and oil repellency, good mechanical properties, and good healing properties. The self-healing of scratched/cut films was demonstrated by heating at mild temperatures of about 40-50° C. for just several minutes. In some cases, a 70° C. heating temperature was used to achieve the healing in just a few minutes. These polyurethane coatings are readily applicable to metal, glass, wood, plastics and fabric because of the strong adhesive properties of the polyurethanes. The obtained coatings are durable due to the semi-crosslinked polyurethanes matrix and are optically clear, even at 10s of micron thickness (e.g., about 10-90 μm or 20-60 μm thick). These coatings can be loaded with nanofillers such as cellulose nanocrystals, graphene oxide, nanoclay, silica particles as well to obtain self-cleaning, self-healing composite films.

In another embodiment and as further illustrated in the examples below, the disclosure relates to a self-healing, self-cleaning polyurethane coating particularly suitable for high-temperature applications (e.g., high temperature exposure during normal use and/or during healing). Urethane coatings were prepared from urethane diisocyanate prepolymer, polyisocyanate crosslinkers, aromatic hydroxy reversible crosslinkers that undergo dynamic exchange bonds with isocyanate groups, and an amino-functional polydimethylsiloxane omniphobic polymer. The resulting crosslinked composition was an optically clear film, with excellent water and oil repellency, good mechanical properties, and good healing properties. The resulting crosslinked composition further was a durable omniphobic self-healing polyurethane coating that could accommodate temperatures up to 120° C. without any change in its structural integrity. As a result, the end coating also healed at higher temperatures. In particular, the self-healing of scratched/cut films was demonstrated by heating at about 120° C. for several minutes. Meanwhile, the low surface energy polydimethylsiloxane material provided anti-smudge properties to the coating. Thus, the end coating was anti-smudge/self-cleaning as well as self-healable. These polyurethane coatings likewise are readily applicable to metal, glass, wood, plastics and fabric because of the strong adhesive properties of the polyurethanes. The obtained coatings are durable due to the semi-crosslinked polyurethanes matrix and are optically clear, even at 10 s of micron thickness (e.g., about 10-90 μm or 20-60 μm thick). These coatings can be loaded with nanofillers such as cellulose nanocrystals, graphene oxide, nanoclay, silica particles as well to obtain self-cleaning, self-healing composite films.

Omniphobic Composition

Figure 3:
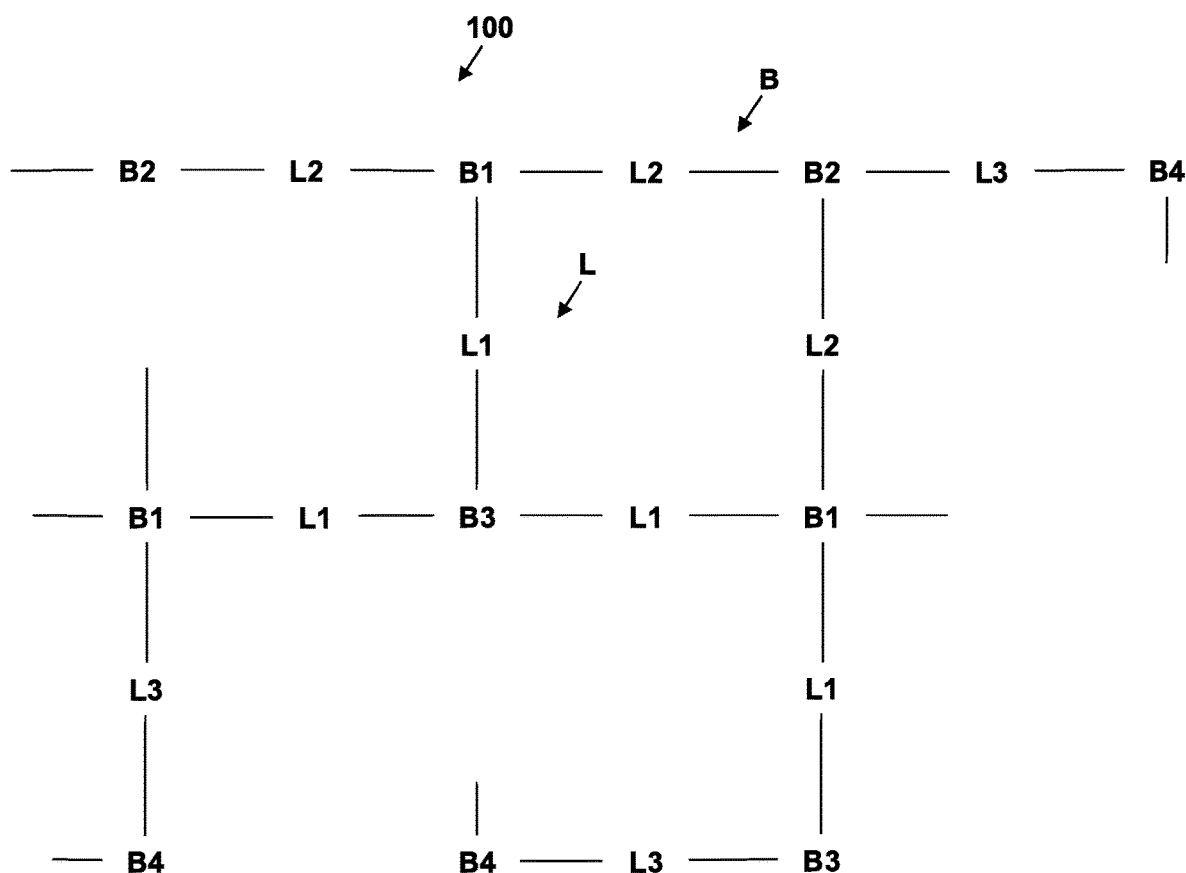
FIG. 3 illustrates a self-healing omniphobic composition according to an embodiment of the disclosure.

FIGS. 3 and 4 illustrate self-healing omniphobic compositions according to the disclosure. FIGS. 3 and 4 qualitatively illustrate various backbone segments (B) and linking groups (L) in self-healing crosslinked polymers 100. In a first embodiment as illustrated in FIG. 3, the polymer 100 includes a crosslinked backbone B, which in turn includes (i) first backbone segments B1, (ii) second backbone segments B2, (iii) third backbone segments B3, (iv) fourth backbone segments B4, (v) first linking groups L1 (e.g., reversible urethane (or carbamate), urea) reversibly linking first backbone segments and third backbone segments, (vi) second linking groups L2 (e.g., urethane, urea) linking first backbone segments and second backbone segments, and (vii) third linking groups linking L3 (e.g., reversibly or irreversibly linking) the fourth backbone segments with at least one of the first backbone segments, the second backbone segments, and the third backbone segments. In a second embodiment as illustrated in FIG. 4, the polymer 100 includes a crosslinked backbone B, which in turn includes (i) optionally first backbone segments B1, (ii) second backbone segments B2, (iii) third backbone segments B3, (iv) fourth backbone segments B4, (v) optionally first linking groups L1 (e.g., reversible urethane (or carbamate), urea) reversibly linking first backbone segments and third backbone segments, (vi) optionally second linking groups L2 linking first backbone segments and second backbone segments, and (vii) third linking groups linking L3 (e.g., reversibly and optionally irreversibly linking) the fourth backbone segments with the second backbone segments and the third backbone segments.

The various backbone segments and linking groups can include the reaction products resulting from polymerization of the corresponding monomer, oligomer, or polymer units. The first backbone segments B1 can result from a polyisocyanate (e.g., monomer, oligomer, or polymer). The second backbone segments B2 can result from a polysiloxane or other omniphobic polymer. The third backbone segments B3 can result from a reversible polyfunctional linker, which can be a di-, tri-, or higher functionality linker or crosslinker, for example having two, three, or more total amino/hydroxy groups for reaction with the polyisocyanate. The amino/hydroxy groups in the reversible linker can include the hindered secondary amino group or aromatic hydroxy group for reversible bond formation. The fourth backbone segments B4 can be generally any reaction product of a monomeric, oligomeric, or polymeric component having di-, tri-, or higher reactive functionality with any of the first, second, or third backbone segments. The linking groups can generally include urea or urethane groups, which can be reversible linking groups (e.g., first linking groups L1) or irreversible linking groups, Urethane (or carbamate) groups and be represented by the general structure —$NR_1$—C(=O)O—, where $R_1$ can be H or a $C_1$-$C_{12}$ linear, branched, or cyclic substituted or unsubstituted hydrocarbon group, such as an aliphatic (e.g., alkyl, alkenyl) group or an aromatic group, or a combination of different $R_1$ groups (such as when multiple different reactive components are used). Urea groups and can be represented by the general structure —$NR_2$—C(=O)—$NR_3$—, where $R_2$ and $R_3$ independently can be H or a $C_1$-$C_{12}$ linear, branched, or cyclic substituted or unsubstituted hydrocarbon group, such as an aliphatic (e.g., alkyl, alkenyl) group or an aromatic group, or a combination of different $R_2$ and/or $R_3$ groups (such as when multiple different reactive components are used).

The first backbone segments B1 can result from a polyisocyanate (e.g., monomer, oligomer, or polymer) after it has reacted with the functionalized omniphobic polymer, reversible polyfunctional linker, and/or fourth backbone precursor (e.g., monomer, oligomer, or polymer). The first backbone segments B1 can result from a single polyisocyanate or a blend of two or more different polyisocyanate species with the same or different degree of functionality, but each being able to react with the other components. For example, the first backbone segments B1 can have a structure corresponding to at least one of a urethane reaction product and a urea reaction product from at least one polyisocyanate (e.g., diisocyanate, triisocyanate, or higher degree of isocyanate functionality) with a hydroxyl-functional (urethane) or an amine-functional (urea) component. The first backbone segments B1 can result from a single polyisocyanate (e.g., a diisocyanate, a triisocyanate) species or a blend of two or more different polyisocyanate species with the same or different degree of isocyanate functionality.

The polyisocyanate is not particularly limited and generally can include any aromatic, alicyclic, and/or aliphatic isocyanates having at least two reactive isocyanate groups (—NCO). Suitable polyisocyanates contain on average 2-4 isocyanate groups. In some embodiments, the polyisocyanate includes a diisocyanate. In some embodiments, the polyisocyanate includes triisocyanate. Suitable diisocyanates can have the general structure (O=C=N)—R—(N=C=O), where R can include aromatic, alicyclic, and/or aliphatic groups, for example having at least 2, 4, 6, 8, 10 or 12 and/or up to 8, 12, 16, or 20 carbon atoms. Examples of specific polyisocyanates include 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI, such as toluene 2,4-diisocyanate), 1-methyl-2,4-diiso-cyanatocyclohexane, 1,6-diisocyanato-2,2,4-trimethyl-hexane, 1,6-diisocyanato-2,4,4-trimethyl-hexane, 1-iso-cyanatomethyl-3-isocyanato-1,5,5-trimethyl-cyclohexane, chlorinated and brominated diisocyanates, phosphorus-containing diisocyanates, 4,4'-diisocyanatophe-nyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

The second backbone segments B2 generally have a structure corresponding to a (polymerization) reaction product from at least one functionalized omniphobic polymer having a glass transition temperature ($T_g$) of 70° C. or 50° C. or less after it has reacted with the polyisocyanate and/or fourth backbone precursor (e.g., monomer, oligomer, or polymer). The functionalized omniphobic polymer includes a functional group reactive with the polyisocyanate and/or fourth backbone precursor, such as an amino group or hydroxyl group. For example, in some embodiments, the second backbone segments B2 can have a structure corresponding to a urea reaction product from at least one amine-functional omniphobic polymer having a glass transition temperature ($T_g$) of 70° C. or 50° C. or less (e.g., monoamine-functional, diamine-functional, or higher degree of amine functionality) and a polyisocyanate. In other embodiments, the second backbone segments B2 can have a structure corresponding to a urethane reaction product from at least one hydroxy-functional omniphobic polymer having a glass transition temperature ($T_g$) of 70° C. or 50° C. or less (e.g., mono isocyanate-functional, diisocyanate-functional, or higher degree of isocyanate functionality) and a polyisocyanate. In various embodiments, the functionalized omniphobic polymer has a glass transition temperature in a range from −150° C. to 70° C. or 50° C. (e.g., at least −150° C., −120° C., −100° C., or −50° C. and/or up to −10° C., 0° C., 10° C., 20° C., 30° C., 40° C., 50° C., 60° C., or 70° C.). The functionalized omniphobic polymer can be either in a liquid or a rubbery state at common use temperatures of the final coating, for example in a range from 10° C. to 40° C. or 20° C. to 30° C. In various embodiments, the functionalized omniphobic polymer is a liquid at a temperature in a range from 10° C. to 40° C. (e.g., from 20° C. to 30° C., or about room temperature, such as where the functionalized omniphobic polymer has a melting temperature ($T_m$) below 10° C. or 20° C.). The functional groups (e.g., amino, hydroxyl) can be terminal and/or pendant from the omniphobic polymer. In an embodiment, the functional groups can be attached directly to the omniphobic polymer, such as in a homopolymer. In an embodiment, the functional groups can be incorporated indirectly into the omniphobic polymer, such as in a comonomer for a (random) omniphobic copolymer. In an embodiment, the functional groups are terminal groups on a omniphobic polymer (e.g., linear omniphobic polymer with one or two terminal functional groups). The second backbone segments B2 can result from a single functionalized omniphobic polymer species or a blend of two or more different functionalized omniphobic polymer species with the same or different degree of functionality. The functionalized omniphobic polymer can generally include one or more of functionalized polysiloxanes, functionalized polyperfluoroethers, functionalized polybutadienes, functionalized poly(ethylene glycol) methyl ether ("PEO"), functionalized polyisobutylene ("PIB"), functionalized branched polyolefins, functionalized low molecular weight polyolefins, functionalized polyacrylates and polymethacrylates (e.g., also including $C_2$-$C_{16}$ pendant alkyl groups), and any other omniphobic polymer with a glass transition temperature of 70° C. or 50° C. or less. In an embodiment, the functionalized omniphobic polymer, the second backbone segments B2, and/or the corresponding omniphobic composition can be free from fluorine or fluorinated components (e.g., not using functionalized polyperfluoroethers or other fluorine-containing components during synthesis).

The functionalized omniphobic polymer is not particularly limited and generally can include any omniphobic polymer with glass transition temperature of 70° C. or 50° C. or less, such as in a range from −150° C. to 70° C. or 50° C. The functional group of the functionalized omniphobic polymer can include one or more amino groups and hydroxyl groups (e.g., including only one type of functional group). Examples of general classes of functionalized omniphobic polymers include functionalized polysiloxanes, functionalized polyperfluoroethers, functionalized polybutadienes, functionalized polyolefins (e.g., polyethylene, polypropylene, polybutylene), and combinations or mixtures thereof. The functionalized omniphobic polymers can be in the form of homopolymers with functional groups (e.g., PDMS-NH$_2$). The functionalized omniphobic polymers can be in the form of block copolymers with other organic monomeric or polymeric units having functional groups (e.g., PDMS-b-(single/multi acrylate with amine groups)). The functionalized omniphobic polymers can be in the form of random copolymers such as using PDMS di/single acrylate copolymerized with various vinyl monomers, in which case some monomers can include reactive functional groups such as an amine group. The functionalized polyperfluoroether (e.g., functionalized polyperfluoropolyethers) can include mono-, di-, or higher functionalized polyperfluoroethers, or a blend of thereof, such as a blend of mono- and di-functional polyperfluorothers. The functionalized polybutadiene can include mono-, di-, or higher functional polybutadienes, or a blend of thereof, such as a blend mono- and di-functional polybutadienes. Many suitable functionalized omniphobic polymers are commercially available (e.g., amine-, isocyanate-, or other functional polydimethylsiloxane (PDMS) with a variety of available degrees of functionality and molecular weights). Omniphobic polymers that are not commercially available in their functionalized form can be functionalized using conventional chemical synthesis techniques, for example including but not limited to hydroamination, thiol-ene Michael reaction of amine-carrying thiols, Mitsunobu reaction, and reductive amination.

The functionalized polysiloxane is not particularly limited and generally can include any polysiloxane having mono-, di-, or higher degrees functionality. In some embodiments, the functionalized polysiloxane includes a mono-functional polysiloxane. In some embodiments, the functionalized polysiloxane includes a di-functional polysiloxane. The polysiloxane can be a polydialklylsiloxane having —Si(R$_1$R$_2$)—O— repeat units, where R$_1$ and R$_2$ independently can be C$_1$-C$_{12}$ linear or branched alkyl groups, C$_4$-C$_{12}$ cycloalkyl groups, unsubstituted aromatic groups, or substituted aromatic groups, in particular where R$_1$ and R$_2$ are methyl groups for a polydimethylsiloxane (PDMS). The functional groups are suitably terminal groups. For example, in an amine-functional polydialklylsiloxane, the structure and terminal groups can be represented by N H$_2$—R$_3$—[Si(R$_1$R$_2$)—O]$_x$—R$_3$—NH$_2$ for a diamine or NH$_2$—R$_3$—[Si(R$_1$R$_2$)—O]$_x$—R$_3$ for a monoamine, where R$_3$ independently can be H (when a terminal group) or C$_1$-C$_{12}$ linear or branched alkyl (when a terminal group or a linker for a terminal amine). The functional groups additionally can be pendant groups, for example in a amine-functional polydialklylsiloxane represented by R$_3$—[Si(R$_1$R$_2$)—O]$_x$—[Si(R$_1$R$_2$)—O]$_y$—R$_3$, where R$_{1'}$ and R$_{2'}$ independently can be the same as R$_1$ and R$_2$, but at least one or both of R$_{1'}$ and R$_{2'}$ independently is a C$_1$-C$_{12}$ linear or branched alkyl linker group with a terminal amine group (e.g., —NH$_2$). In some embodiments, one or more of R$_1$, R$_2$, R$_{1'}$, and R$_{2'}$ can include three or more fluorine atoms (e.g., partially or fully fluorinated analogs of the various hydrocarbon groups). Illustrative hydroxy-functional polydialklylsiloxanes can be represented by the foregoing structures with hydroxy groups (—OH) replacing the amino groups (—NH$_2$). Some examples of functionalized polyslioxanes include functionalized polydimethylsiloxane, functionalized polymethylphenylsiloxane, and functionalized polydiphenylsiloxane.

Some examples of polyperfluoropolyethers with functional group(s) include functionalized poly(n-hexafluoropropylene oxide) (e.g., —(CF$_2$CF$_2$CF$_2$O)n-)NH$_2$ or —(CF$_2$CF$_2$CF$_2$O)n-)OH for amino or hydroxy groups) and functionalized poly(hexafluoroisopropylene oxide) (e.g., —(CF(CF$_3$)CF$_2$O)nNH$_2$ or PFPO—NH$_2$; —(CF(CF$_3$)CF$_2$O)nOH or PFPO-OH). Such omniphobic polymers can be in the form of homopolymers (e.g., —(CF$_2$CF$_2$CF$_2$O)n-) NH$_2$), or as block copolymers with other organic polymers having functional groups such as amine groups. The omniphobic polymers also can be in the form of random copolymers such as using FOMA acrylate copolymerized with various vinyl monomers, in which case some monomers can include reactive functional groups such as an amine group. Some examples of functionalized atactic polyolefins include functionalized poly(1-butene), branched polyethylene, poly(cis-isoprene), poly(trans-isoprene), and poly (1-octene). Some examples of functionalized polyacrylates include poly (3-functionalized propyl acrylate). Similarly, mono-functional polymers include mono-functional polyisobutylene (e.g., PIB—NH$_2$; PIB—OH), mono-functional polypolyethylene glycol (e.g., PEG-NH$_2$, PEG-OH), mono-functional poly(1-butene) (e.g., PB—NH$_2$, PB—OH, cis and trans) can also be used as the low-glass transition temperature (T$_g$ less than 70° C. or 50° C.) polymers, either alone or in combination with other functionalized omniphobic polymers.

The functionalized omniphobic polymers can have any suitable molecular weight in view of desired glass transition temperature, for example having a molecular weight ranging from 300 to 50,000 g/mol. In various embodiments, the molecular weight can be at least 300, 800, 1000, 1500, or 2000 and/or up to 1000, 2000, 3000, 5000, or 50,000 g/mol. The molecular weight can be expressed as a number-average or weight-average value in the units of gram/mole (g/mol). Alternatively or additionally, the functionalized omniphobic polymer can have a number of repeat units ranging from 4 to 600 (e.g., at least 4, 10, 12, 15, 20, or 25 and/or up to 12, 15, 20, 30, 40, 60, 200, or 600; such as a (number) average number of repeat units). Some embodiments can include a blend of two or more amine- functionalized omniphobic polymers with different average molecular weights, such as one with 300-1500 g/mol and another with 1500-50,000 g/mol with a higher average molecular weight than the first. Blends of functionalized omniphobic polymers (e.g., differing in molecular weight and/or in degree of functionality) can improve the combination of water- and oil-repellency properties of the final composition. For example, a mono-functional polysiloxane can provide better water and oil repellency than a di-functional polysiloxane. Low MW functionalized polysiloxanes (e.g., PDMS, such as having a MW range of about 800-1200 g/mol or an average MW of about 1000 g/mol) can provide an improved water repellency, while Higher MW functionalized polysiloxanes (e.g., PDMS, such as about 2000 g/mol or above for an average or range of Mw) can provide an improved oil repellency.

The third backbone segments B3 can result from a reversible polyfunctional linker after it has reacted with the polyisocyanate and/or fourth backbone precursor (e.g., monomer, oligomer, or polymer). The reversible polyfunctional linker can be a di-, tri-, or higher functionality linker or crosslinker, for example having two, three, or more total amino/hydroxy groups for reaction with the polyisocyanate, in particular hindered secondary amino groups and/or aromatic hydroxy groups. In an embodiment, the third backbone segments B3 can have a structure corresponding to a reversible urea reaction product between a polyisocyanate or a polymeric polyisocyanate and the hindered secondary amino group of the reversible polyfunctional linker. In an embodiment, the third backbone segments B3 can have a structure corresponding to a reversible urethane reaction product between a polyisocyanate or a polymeric polyisocyanate and the aromatic hydroxy group of the reversible polyfunctional linker. The third backbone segments B3 can result from a reversible polyfunctional linker or a blend of two or more different reversible polyfunctional linkers.

In an embodiment, the reversible polyfunctional linker includes one or more hindered secondary amino groups, for example one, two, or more than two hindered secondary amino groups. The hindered secondary amino group generally has a structure of $R_1(NH)R_2G$. $R_1$ can generally include any sterically hindering group, for example a hydrocarbon or other group having from 1 to 18 carbon atoms (e.g., at least 1, 2, 3, 4 and/or up to 4, 6, 8, 10, 12, or 18 carbon atoms). For example, $R_1$ can be an alkyl or alkenyl (e.g., linear or branched), cycloalkyl or cycloalkenyl, or aromatic or heteroaromatic group (e.g., with 1, 2, or 3 N, O, S, or P heteroatoms in an aromatic structure with carbon atoms, such as a 5-, 6-, 7-, 8-, 9-, 10-, or higher membered ring). Specific examples for $R_1$ include $C_1$-$C_4$ alkyl, such as isopropyl, sec-butyl, and tert-butyl. Other examples for $R_1$ include aryl, $(C_1$-$C_{20})$alkyl, $(C_4$-$C_{10})$cyclolalkyl, $(C_1$-$C_{20})$alkyl$(C_4$-$C_{10})$cyclolalkyl, $(C_1$-$C_{20})$alkyl$(C_4$-$C_{10})$cyclolalkyl$(C_1$-$C_{20})$alkyl, and $(C_2$-$C_{20})$alkyl-PEG-$(C_2$-$C_{20})$alkyl, with or without an intervening linking carbon between the foregoing groups and the —NH— group. The group —NH— corresponds to the secondary nitrogen atom/amino group. $R_2$ can generally include any linking group to at least one other amino or hydroxy group(s) G that is capable of reacting with the polyisocyanate to form a corresponding urea or urethane group, respectively, which urea or urethane group can be a reversible or irreversible. $R_2$ likewise can be an alkyl or alkenyl (e.g., linear or branched), cycloalkyl or cycloalkenyl, or aromatic or heteroaromatic group (e.g., with 1, 2, or 3 N, O, S, or P heteroatoms in an aromatic structure with carbon atoms). Specific examples for $R_2$ include $C_1$-$C_4$ alkylene, such as methylene, ethylene, propylene, and butylene. Other examples for $R_2$ include $(C_1$-$C_{100})$alkyl, $(C_1$-$C_{20})$alkyl, $(C_4$-$C_{10})$cyclolalkyl, $(C_1$-$C_{20})$alkyl$(C_4$-$C_{10})$cyclolalkyl, $(C_1$-$C_{20})$alkyl$(C_4$-$C_{10})$cyclolalkyl$(C_1$-$C_{20})$alkyl, $(C_1$-$C_{20})$alkyl$(C_6$-$C_{10})$aryl$(C_1$-$C_{20})$alkyl, $(C_2$-$C_{20})$alkyl-PEG-$(C_2$-$C_{20})$alkyl, $(C_1$-$C_{20})$alkylO$(C_1$-$C_{20})$alkyl, $(C_1$-$C_{20})$alkylS$(C_1$-$C_{20})$alkyl, —N($R_1$)—, =N—, —C(X)$_2$— (X is halo), —NC(=O)($C_1$-$C_{20}$)alkyl, —C(=O)($C_1$-$C_{20}$)alkyl-, —C(=O)—(NR$_1$)—, —S(=O)$_2$O—, —S(=O)$_2$—($C_1$-$C_{20}$)alkyl-, —OS(=O)$_2$O($C_1$-$C_{20}$)alkyl-, —S(=O)$_2$NR$_1$—, —S(=O)($C_1$-$C_{20}$)alkyl-, —P(=O)(OR$_1$)O—, —C(S)—($C_1$-$C_{20}$)alkyl-, —C(=O)O($C_1$-$C_{20}$)alkyl-, —C(=O)O—, —C(=S)O($C_1$-$C_{20}$)alkyl-, —C(=O)S($C_1$-$C_{20}$)alkyl-, —C(=S)S($C_1$-$C_{20}$)alkyl-, —C(=O)NR$_1$—($C_1$-$C_{20}$)alkyl-, and —C(=NR$_1$)NR$_1$—.

In a particular embodiment where the reversible polyfunctional linker has two (e.g., only two) two hindered secondary amino groups, the structure can be represented by $R_1(NH)R_2(NH)R_3$. $R_3$ can be any sterically hindering group analogous to $R_1$, for example according to any of the above definitions for $R_1$, but $R_1$ and $R_3$ can be the same or different. In a particular embodiment where the reversible polyfunctional linker has one hindered secondary amino group (e.g., contains only one hindered secondary amino group), the structure can be represented by $R_1(NH)R_2(NH_2)$ or $R_1(NH)R_2(OH)$. $R_1$ and $R_2$ can be as described above. Examples of suitable reversible polyfunctional linkers include N,N'-di(t-butyl) ethylenediamine, N,N'-di(iso-propyl) ethylenediamine and N,N'-di(iso-butyl) ethylenediamine. Additionally, hindered amine compounds carrying reactive groups such as hydroxyl can be used for reversible urea-urethane systems (e.g., 2,2,6,6-Tetramethyl-4-piperidinol).

In an embodiment, the reversible polyfunctional linker includes one or more aromatic hydroxy groups, for example one, two, or more than two aromatic hydroxy groups. The aromatic hydroxy group includes a hydroxy (OH) group bound directly to an aromatic or heteroaromatic group (e.g., with 1, 2, or 3 N, O, S, or P heteroatoms in an aromatic structure with carbon atoms, such as a 5-, 6-, 7-, 8-, 9-, 10-, or higher membered ring), for example including a phenolic group or hydroxyphenyl group. The aromatic hydroxy group can include multiple hydroxy groups bound to the same aromatic or heteroaromatic group (e.g., as in the case of a gallic acid derivative), for example where the polyfunctional linker has only one aromatic or heteroaromatic group but multiple hydroxy groups attached thereto for at least two aromatic hydroxy groups. In some other embodiments, the aromatic hydroxy group can include two or more aromatic or heteroaromatic groups linked together, each with one or more hydroxy groups attached thereto (e.g., such as for a bisphenol compound having two hydroxyphenyl groups). In a particular embodiment, the reversible polyfunctional linker can be represented by the general structure (HO)AR$_2$(NH$_2$) or (HO)AR$_2$(OH). A is an aromatic or heteroaromatic group as described above, and $R_2$ can be as described above for the hindered amine. Examples of suitable reversible polyfunctional linkers include gallic acid esters (e.g., propyl gallate), benzene diols (e.g., 1,4-benzenediol, 1,3-benzenediol, 1,2-benzenediol), halo-substituted benzene diols (e.g., 2-chloro-1,4-benzenediol), alkyl-substituted benzene diols (e.g., 2-methyl-1,4-benzenediol), bisphenols (e.g., bisphenol A, bisphenol F), ubiquiniol, genistein, gallic acid, pyrogailol, aloe emodin, and poly(caffeic acid methyl ester). In certain cases, one or more hydroxy groups can be attached to a non-aromatic carbon and one or more hydroxy groups can be attached to an aromatic ring such as in polytyrosol.

The fourth backbone segments B4 can be generally any reaction product of a monomeric, oligomeric, or polymeric component having di-, tri-, or higher reactive functionality with any of the first, second, and/or third backbone segments. In an embodiment, the fourth backbone segments B4 can have a structure corresponding to a reversible or irreversible urea or urethane reaction product between (i) a (polymeric) polyisocyanate, a (polymeric) polyhydroxy compound (e.g., polyol), and/or a polyepoxide with (ii) the reversible polyfunctional linker and/or the functionalized omniphobic polymer.

In an embodiment, the fourth backbone segments can have a structure corresponding to a reaction product of a fourth backbone precursor, which can be a polyurethane with two or more functional groups reactive with one or more of the polyisocyanate, the functionalized omniphobic polymer, and the reversible polyfunctional linker. In a particular refinement, the fourth backbone precursor can be a polyurethane with two or more isocyanate groups as the functional groups. The polyurethane can be an oligomeric or polymeric polyurethane prepolymer, for example a linear polyurethane prepolymer. In some embodiments, the polyurethane has two (e.g., only two) functional groups reactive with the other omniphobic polymer components, for example at opposing terminal ends of the polyurethane (e.g., for a linear polyurethane). An example reactive functional group can include isocyanate, for example a diisocyanate-terminated polyurethane, which then can react with the functionalized omniphobic polymer, and the reversible polyfunctional linker to form the final omniphobic polymer. In such case, the bonds formed with the reversible polyfunctional linker also could be reversible urea or urethane bonds (e.g., as with the polyisocyanate of the first backbone segment). Another example reactive functional group can include hydroxy, for example a dihydroxy-terminated polyurethane as a fourth backbone precursor, which then can react with the polyisocyanate to form the final omniphobic polymer.

In an embodiment, the fourth backbone segments can have a structure corresponding to a reaction product of a fourth backbone precursor, which can be a polyepoxide having two or more epoxide functional groups reactive with one or more of the functionalized omniphobic polymer and the reversible polyfunctional linker. The polyepoxide can be a monomeric, oligomeric, or polymeric di- or higher epoxide, for example a linear oligomeric or polymeric prepolymer with two or more epoxy groups. The epoxide functional group can react with hindered secondary amines to form linear oligomers and polymers such that having sec-amine on both ends of these oligomers and polymers, which are then crosslinked by reversible urea bond by reacting with a polyfunctional isocyanate and functionalized omniphobic polymer (e.g., amino-PDMS).

The polyepoxide can include polyepoxide-substituted aromatic hydrocarbons, aliphatic hydrocarbons, cycloaliphatic hydrocarbons, ethers thereof, esters thereof, imines thereof, and combinations thereof. The polyepoxide can include hydrocarbons with two or more epoxide groups and one or more aromatic, aliphatic, cycloaliphatic, ether, ester, and/or imine groups in the hydrocarbon to which the epoxide groups are attached. Suitable polyepoxides can be derived from petroleum and plant materials. Suitable polyepoxides include two or more glycidyl ether groups (i.e., epoxide-containing groups). Some examples of polyepoxides include, but are not limited to, bisphenol A epoxy (e.g., diglycidyl ether of bisphenol A having 1 or 2-25 bisphenol A repeat units), bisphenol F epoxy (e.g., diglycidyl ether of bisphenol F having 1 or 2-25 bisphenol F repeat units), epoxy phenol novolac, epoxy cresol novolac, cycloaliphatic epoxies, halogenated epoxies, epoxy-vinyl esters, tetraglycidylmethylenedianiline (TGMDA), 3,4-epoxycyclohexylmethyl 3,4-epoxycyclohexanecarboxylate (ECC), bis[3,4-epoxycyclohexylmethyl] adipate (BECHMA), poly(glycidyl methacrylate), epoxies of rosin acid, epoxies of diphenolic acid, epoxies of tannin acid, epoxies derived from glucose, isosorbide epoxies, eugenol epoxies, furan epoxies, cathechin epoxides, vanillin-based epoxies, quercetin epoxides, epoxies derived from gallic acid, epoxides from phenols, epoxides from cardanols, epoxides from plant oils, terpene oxides (e.g., limonene dioxide), and combinations thereof.

In various embodiments, the first and/or third linking groups L1, L3 can include reversible bonds linking their respective backbone segments, for example reversible urea bonds or reversible urethane bonds. The reversible urea bonds generally include a reversible urea reaction product between an isocyanate functional group (e.g., in the polyisocyanate) and a hindered secondary amino group (e.g., in the reversible polyfunctional linker). The reversible urethane bonds generally include a reversible urethane reaction product between an isocyanate functional group (e.g., in the polyisocyanate) and an aromatic hydroxy group (e.g., in the reversible polyfunctional linker). The self-healing omniphobic polymer has a crosslinked backbone with a network structure of covalent bonds, which is characteristic of a thermoset polymer. Because of the presence of the reversible bonds, the omniphobic polymer can be additionally characterized as a reversible thermoset or vitrimer polymer that can flow similarly to a (viscoelastic) liquid at relatively high temperatures and that can behave as a conventional thermoset (solid) at relatively lower temperatures.

The reversible urea reaction product generally corresponds to a urea reaction product in dynamic equilibrium between the isocyanate groups of the polyisocyanate forming the first backbone segments and the hindered secondary amino group of the reversible polyfunctional linker. The equilibrium is substantially shifted to the urea reaction product (e.g., at least 50%, 60%, 70%, 80%, 90% and/or up to 80%, 90%, 95%, 98%, 99, or 99.99% of isocyanate and secondary amino groups are in urea form), but at least some of the isocyanate and secondary amino groups are unreacted (e.g., at least 1%, 2%, 5%, 10%, or 20% and/or up to 20%, 30%, 40%, or 50% of isocyanate and secondary amino groups are unreacted), which unreacted groups exist due to the equilibrium between dynamic urea bond. The equilibrium is dynamic as a result of steric hindrance from the secondary amino group, resulting in a continuous breaking and reforming of the urea bonds between different isocyanate and secondary amino groups, even at normal use temperatures. Self-healing can be accelerated by heating a damaged omniphobic composition because it accelerates the equilibrium reaction (although it need not necessarily shift the equilibrium toward more or fewer urea groups) and softens the composition without melting or destroying it. A softened composition promotes polymer chains contact at a damaged interface between different regions of the composition, whereupon the dynamic urea bonds can re-form at the damaged interface to rejoin the separated portions of the composition.

The reversible urethane reaction product generally corresponds to a urethane reaction product between the isocyanate groups of the polyisocyanate forming the first backbone segments and the aromatic hydroxy group of the reversible polyfunctional linker. In contrast to the reversible urea bond, the reversible urethane bond need not be in equilibrium, dynamic or otherwise (e.g., substantially all of the isocyanate and aromatic hydroxy groups are in urethane form). The bond is reversible in that the application of heat to the composition can break the reversible urethane bond to re-form the isocyanate and aromatic hydroxy groups because of the ability of the aromatic group to which the hydroxy group is attached to delocalize and stabilize a negative charge when the urethane bond first breaks. Heating can also bring about an equilibrium state between the urethane, isocyanate, and aromatic hydroxy groups at the higher temperatures, but which equilibrium state did not exist at normal use temperatures. Self-healing can be thus effected by heating a damaged omniphobic composition because it breaks at least some urethane groups and softens the composition without melting or destroying it. A softened composition promotes contact at a damaged interface between different regions of the composition, whereupon the reversible urethane bonds can re-form at the damaged interface to rejoin the separated portions of the composition, which urethane bonds remain and continue to form as it cools.

The first, second, third, and fourth backbone segments can be incorporated into the self-healing omniphobic polymer in a variety of relative weight amounts. In an embodiment, the first backbone segments can be present in an amount ranging from 0.05 wt. % to 20 wt. % relative to the omniphobic composition (e.g., at least 0.05, 0.1, 0.2, 0.5, 1, 2, 3, or 5 wt. % and/or up to 3, 5, 8, 10, 15 or 20 wt. %), for example 0.05 wt. % to 10 wt. %, 1 wt. % to 10 wt. %, 0.5 wt. % to 5 wt. %, or 1 wt. % to 5 wt. %. In an embodiment, the second backbone segments can be present in an amount ranging from 0.05 wt. % to 20 wt. % relative to the omniphobic composition (e.g., at least 0.01, 0.05, 0.1, 0.2, 0.5, 1, 2, 3, or 5 wt. % and/or up to 3, 5, 8, 10, 15 or 20 wt. %), for example 0.2 wt. % to 8 wt. %, 0.5 wt. % to 5 wt. %, or 1 wt. % to 5 wt. %. In an embodiment, the third backbone segments can be present in an amount ranging from 2 wt. % to 80 wt. % relative to the omniphobic composition (e.g., at least 2, 5, 10, 15, or 20 wt. % and/or up to 30, 40, 50, 60, 70, or 80 wt. %), for example 20 wt. % to 60 wt. %. In an embodiment, the fourth backbone segments can be present in an amount ranging from 10 wt. % to 90 wt. % relative to the omniphobic composition (e.g., at least 10, 15, or 20 wt. % and/or up to 30, 40, 50, 60, 70, 80, or 90 wt. %), for example 30 wt. % to 70 wt. %. In an embodiment, the second backbone segments relative to the first backbone segments can be present in the omniphobic polymer in an amount ranging from 1:2 to 1:100 (e.g., at least 1:2, 1:3, 1:4, 1:5, or 1:10 and/or up to 1:5, 1:10, 1:20, 1:30, 1:40, 1:50, or 1:100). The foregoing ranges can apply as well to the relative weight amounts of the polyisocyanate (i.e., first backbone segment component), the functionalized omniphobic polymer (i.e., second backbone segment component), the reversible polyfunctional linker (i.e., third backbone segment component), and the fourth backbone precursor relative to the total weight amount of the four components before crosslinking reactions and/or relative to all monomeric, oligomeric, and polymeric reaction components added thereto.

In an embodiment, the self-healing omniphobic composition can include any suitable organic or inorganic filler or additive, which can be included to improve one or more of mechanical properties, optical properties, electrical properties, and omniphobic properties of the final composition. Examples of suitable fillers or additives include nanoclay, graphene oxide, graphene, graphite (e.g., ground), silicon dioxide (silica), aluminum oxide, cellulose nanocrystals, carbon nanotubes, zirconia, titanium dioxide (titania), diatomaceous earth, biocides, pigments, dyes, thermoplastics, low and high molecular weight poly(ethylene oxide), salts (e.g., tetra alkyl ammonium), non-ionic ingredients (e.g., non-surfactants such as TWEEN or polysorbate 80, TWEEN or polysorbate 85), polyhedral oligomeric silsesquioxane (POSS) and POSS derivatives, and functional agents (e.g., antistatic agents, UV blockers). The additives can be nano-scale (nanofillers) or micro-scale (microfillers). The additives can be included in the coating composition in a range from 0.5 to 40 wt. %, for example at least 0.5, 1, 2, 5, 7, or 10 wt. % and/or up to 5, 10, 15, 20, 30, or 40 wt. %. The additives can improve thermal conductivity of the corresponding coating, for example including graphene oxide, (ground) graphite, etc. The additives can improve the mechanical properties of the corresponding coating, such as wear-resistance, for example for coatings including zirconia, silica, titania, etc.

The omniphobic properties of the self-healing omniphobic composition or corresponding coating (e.g., for the cured composition, such as on a substrate) can be characterized in terms of one or more contact angles and/or sliding angles for water and/or oil droplets (e.g., vegetable oil and/or hexadecane) on the self-healing coating (e.g., as a coating on a substrate). The following ranges are representative of compositions and coatings according to the disclosure which display favorable omniphobic properties. For example, the self-healing omniphobic composition (e.g., in the form of a coating) can have a water contact angle in a range from 90° to 120°, an oil contact angle in a range from 1° to 65°, a water sliding angle in a range from 1° to 30° for a 75 µl droplet, and/or an oil sliding angle in a range from 1° to 20° for a 25 µl droplet.

Figure 9:
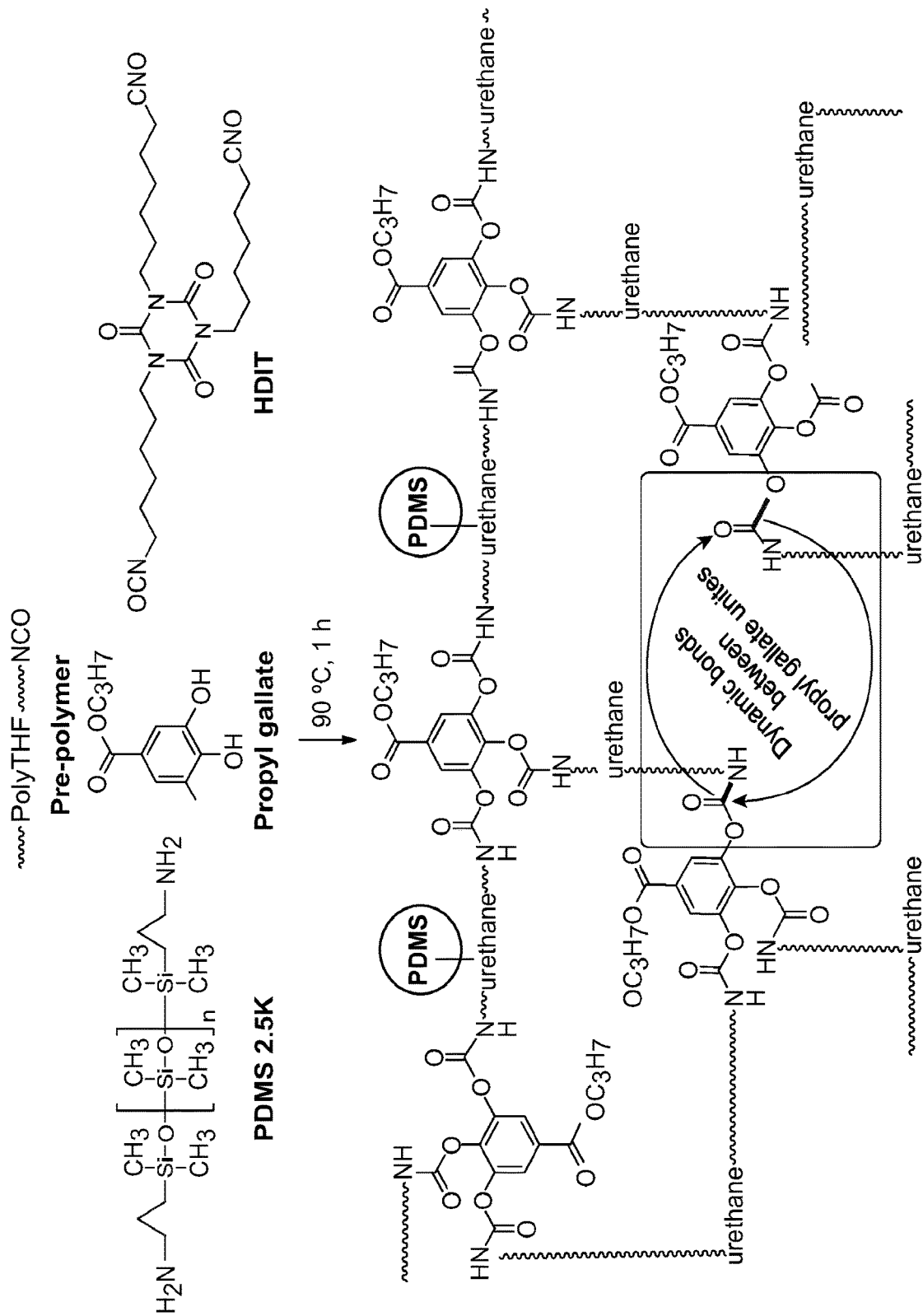
FIG. 9 illustrates a chemical reaction between propyl gallate, PU-prepolymer, HDIT and PDMS-2.5K.
Figure 10:
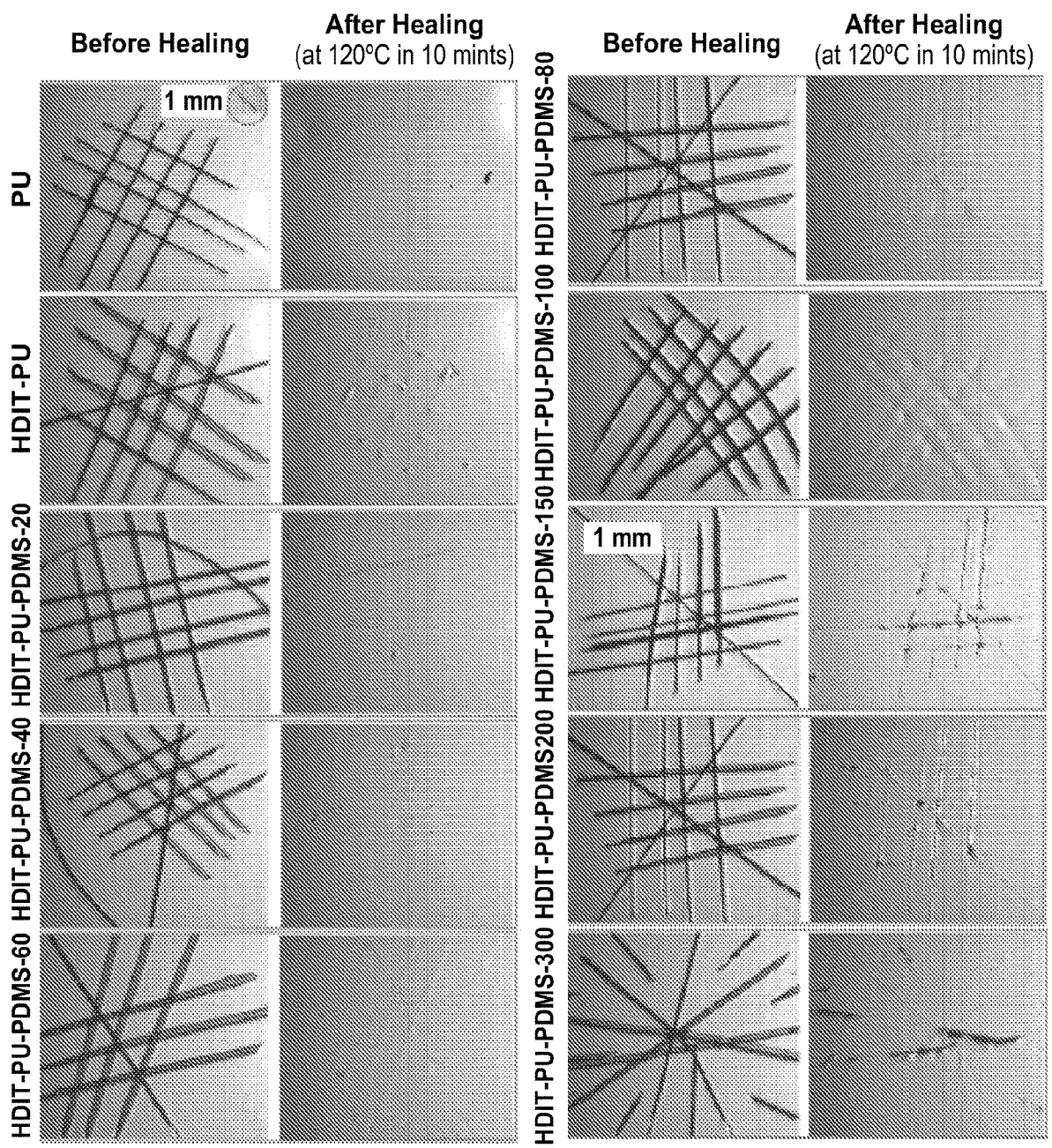
FIG. 10 includes photographs illustrating self-healing behavior for coating compositions according to another aspect of the disclosure.

The thermoset omniphobic composition generally has a homogeneous structure, for example a homogenous thermoset solid with the first, second, third, and fourth backbone segments being generally evenly distributed throughout the composition as illustrated in FIG. 9. In an embodiment, the self-healing omniphobic composition can a heterogeneous structure, for example a composite structure with one or more additives or nanofillers distributed throughout the omniphobic composition as a matrix formed from the first, second, third, and fourth backbone segments. In another embodiment, the thermoset omniphobic composition can have a composite structure as illustrated in FIG. 10. The composite structure can include a solid matrix formed primarily from the first, third, and fourth backbone segments linked together (e.g., with or without some second backbone segments incorporated therein). The composite structure can further include nanodomains distributed throughout the solid matrix. The nanodomains are formed primarily from the second backbone segments (e.g., with or without minor amounts of first, third, and/or fourth backbone segments incorporated therein), and generally have a size of 80 nm or less, more preferably 50 nm or 40 nm or less. The nanodomains can be liquid nanodomains or rubbery nanodomains, depending on the usage temperature of the omniphobic composition relative to the glass transition and melting temperatures of the functionalized omniphobic polymer precursor to the second backbone segments. For example, the nanodomains can have a size or diameter of at least 0.1, 1, 10, 15 or 20 nm and/or up to 30, 40, 50, or 80 nm; for example 1 nm to 40 nm or 1 nm to 80 nm. The ranges can represent a distribution of sizes for the nanodomains and/or a range for an average nanodomain size (e.g., weight-, number-, or volume-average size). In a lower limit as the size of the nanodomains approaches zero, the composition approaches a homogeneous structure as a homogeneous omniphobic composition as described above.

Coated Article

FIGS. 5 and 6 illustrate an aspect of the disclosure in which a coated article 300 (e.g., desirably having omniphobic properties on at least one surface thereof) includes a substrate 200 and the self-healing omniphobic composition 100 coated on a surface 202 of the substrate 200. The composition 100 can be in the form of a coating or film on an external, environment-facing surface 202 of the substrate 200 (e.g., where the surface 202 would otherwise be exposed to the external environment in the absence of the composition 100). In this case, the self-healing omniphobic composition 100 provides omniphobic protection to the underlying substrate 200.

The substrate 200 is not particularly limited, and generally can be formed from any material desired for protection with an omniphobic coating, in particular given the good, broad adhesive capabilities of the self-healing omniphobic composition 100. For example, the substrate can be a metal, plastic, a different thermoset material (e.g., a primer material; material other than the other than thermoset omniphobic composition), glass, wood, fabric (or textile), cellulose, lignocellulose, or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), starch, chitosan, etc. Suitable wood materials can be any type of wood commonly used in home, office, and outdoor settings. Suitable glass materials can be those used for building windows, automobile windows, etc. In some embodiments, the substrate 200 is a top layer of a coating or series of coatings on a different underlying substrate. For example, the coated article can include a substrate 200 material as generally disclosed herein, one or more intermediate coatings on the substrate 200 (e.g., an epoxy coating, an acrylic coating, another primer coating, etc.), and the self-healing omniphobic composition 100 on the one or more intermediate coatings as the final, external coating on the coated article 300.

The self-healing omniphobic composition 100 can have any desired thickness on the substrate 200. In common applications, the composition 100 has a thickness ranging from 0.010 µm to 500 µm, for example at least 0.01, 10, 20, 50, or 100 µm and/or up to 200, 500 µm. Typical cast coatings can have thicknesses of 10 µm to 100 µm. Typical spin coatings can have thicknesses of 0.05 µm or 0.10 µm to 0.20 µm or 0.50 µm. Multiple coating layers can be applied to substrate 200 to form even thicker layers of the composition 100 (e.g., above 500 µm or otherwise) if desired.

Methods of Making and Use

The self-healing omniphobic composition according to the disclosure generally can be formed by first reacting the polyisocyanate(s), the functionalized omniphobic polymer(s), the reversible polyfunctional linker(s), and the fourth segment precursor(s) to form a partially crosslinked (e.g., not fully crosslinked) reaction product, and then curing the partially crosslinked reaction product to form the self-healing omniphobic composition (e.g., after application a substrate to provide an omniphobic coating thereon). The partially crosslinked reaction product contains at least some unreacted first, second, third, and/or fourth functional groups for eventual further reaction during curing/full crosslinking. The initial, partial crosslinking reaction can be performed in a suitable reaction solvent or medium, for example an aprotic organic solvent such as acetone, tetrahydrofuran, 2-butanone, esters (e.g., methyl, ethyl, n-propyl, butyl esters of acetic acid such as n-butyl acetate, etc.), dimethylformamide, dimethyl carbonate, etc. In some embodiments, a reaction catalyst such as salts of tin (e.g., tin(II) 2-ethylhexanoate) or iron, and tertiary amines (e.g., triethylamine) can be used to catalyze the reaction between an isocyanate group and a hydroxy group. Curing can be performed by heating (e.g., in an oven, with exposure to a heat lamp, etc.) or without heating (e.g., an ambient or room temperature). For example, can be performed at a temperature from 20° C. to 150° C., such as at least 0° C., 20° C., 40° C., or 60° C. and/or up to 20° C., 30° C., 40° C., 60° C., 80° C., 100° C., or 150° C., and for a time from 1 min to 300 min or 5 min to 300 min, such as 1, 2, 5, or 10 min to 20, 40, 60, 120, or 300 min. In a particular case of low heating or ambient temperature curing, curing can be performed at a temperature from 20° C. to 30° C. and for a time from 1 min to 260 hr or 4 hr to 400 hr.

Reaction to form the partially crosslinked reaction product generally can be performed at any suitable reaction temperature(s) and time(s), which can be selected such that there is sufficient time to partially (but not completely) crosslink/cure the components of the reaction mixture, thus leaving some reactive functional groups for eventual full curing/crosslinking in the final self-healing composition. In an embodiment, reaction to form the partially crosslinked reaction product is performed at a temperature from 0° C. to 150° C. or 20° C. to 100° C., such as at least 0° C., 20° C., 40° C., or 60° C. and/or up to 20° C., 30° C., 40° C., 60° C., 80° C., 100° C., or 150° C., and for a time from 1 min to 300 min or 5 min to 300 min, such as 1, 2, 5, or 10 min to 20, 40, 60, 120, or 300 min. The reaction can be performed with or without heating the reaction mixture. Room-temperature (e.g., 20° C. to 30° C.) reactions are possible with longer reaction times and/or the addition of a catalyst.

In a general process, the first, second, third, and fourth components can be combined in any desired order, for example by at least partially pre-reacting a subset of the components before adding remaining components to form the partially crosslinked reaction product. In some illustrative embodiments, the first (e.g., HDIT or other polyisocyanate), second (e.g., amino-PDMS or other functionalized omniphobic polymer), and third (e.g., hindered amine linker or other reversible polyfunctional linker) components are combined and pre-reacted. Then the fourth (e.g., PU-NCO or other fourth segment precursor) and further first components are added to form the partially crosslinked reaction product. In some illustrative embodiments, the first (e.g., HDIT or other polyisocyanate), third (e.g., hydroxy aromatic linker or other reversible polyfunctional linker), and fourth (e.g., PU-NCO or other fourth segment precursor) components are combined and pre-reacted. Then the second (e.g., amino-PDMS or other functionalized omniphobic polymer) component is added to form the partially crosslinked reaction product. In some illustrative embodiments, the third (e.g., hindered amine linker or other reversible polyfunctional linker) and fourth (e.g., BPA-diepoxide or other fourth segment precursor) components are combined and pre-reacted. Then the first (e.g., HDIT or other polyisocyanate) and second (e.g., amino-PDMS or other functionalized omniphobic polymer) components are added to form the partially crosslinked reaction product. In some embodiments, at least some of the first (e.g., HDIT or other polyisocyanate) and second (e.g., amino-PDMS or other functionalized omniphobic polymer) components are separately combined and pre-reacted before adding to other reaction components to form the partially crosslinked reaction product. This step of separately reacting the first and second components can help to ensure that the second component is relatively evenly reacted with and distributed among the first component to provide sufficient remaining isocyanate reactivity on the first component for reaction with the third and/or fourth components. In some illustrative embodiments, the first (e.g., HDIT or other polyisocyanate), third (e.g., reversible polyfunctional linker), and fourth (e.g., PU-NCO or other fourth segment precursor) components are combined, cast on a substrate, and then allowed to partially crosslink the coating. The second (e.g., amino-PDMS or other functionalized omniphobic polymer) component is then added as a surface layer (e.g., via dipping, spraying, roller brush, or drop cast methods) to the partially crosslinked coating, where it can react with at least one of the other three components in a surface layer to form the partially crosslinked reaction product.

The disclosure further relates to methods for repairing damaged self-healing compositions. Damage is typically in the form of cuts, punctures, dents, scratches, etc., for example on an external surface of the composition serving as a coating for a substrate or other coated article. The surface-damaged self-healing omniphobic composition can be heated for a time sufficient and at a temperature sufficient to at least partially repair the surface damage by rejoining separated surfaces and reforming first and/or third (reversible) linking groups at the rejoined separated surfaces. The repair of the damaged surface can be essentially complete such that there is no remaining outward visual indication of the original surface damage after repair. An optical microscope along a scale can be used to observe and measure the degree of healing and recovery, for example can by measuring cut width before and after healing. Suitable healing times can range from 1 min to 72 hours, such as 5 min to 30 min, 6 hr, or 24 hr. More generally, suitable heating times can be at least 1, 2, 5, 10, 30, 60, or 120 min and/or up to 0.2, 0.5, 1, 2, 4, 6, 12, 24, 48, or 72 hr.

Heating the surface-damaged composition for repair can be performed as variety of suitable temperature, for example at a temperature in a range from 18° C. to 150° C. In some cases, the temperature sufficient for repair can include ambient temperatures, for example heating or otherwise exposing the damaged omniphobic composition to a temperature of at least 18, 20, or 25° C. and/or up to 20, 25, or 30° C. When heating to elevated temperatures above ambient conditions, suitable temperatures can include at least 40, 60, 80, or 100° C. and/or up to 60, 80, 100, or 120° C. For compositions including reversible urea bonds, particularly suitable temperatures can range from 18° C.-40° C. for relatively short treatment times (e.g., up to about 10 min). For compositions including reversible urethane bonds, particularly suitable temperatures can range from 100° C.-120° C. for relatively short treatment times (e.g., up to about 10 min).

EXAMPLES

The examples illustrate the disclosed compositions and methods, but are not intended to limit the scope of any claims thereto. In the examples, self-healing omniphobic compositions generally according to the disclosure are prepared and applied as a film or coating on a test substrate such as glass. Example 1 provides illustrative examples of self-healing omniphobic polyurethanes using a hindered amine reversible polyfunctional linker. Example 2 provides illustrative examples of self-healing omniphobic polyurethanes using an aromatic hydroxy reversible polyfunctional linker. Example 3 provides illustrative examples of self-healing omniphobic epoxies using a hindered amine reversible polyfunctional linker. Example 4 provides illustrative examples of self-healing omniphobic polyurethanes incorporating a top omniphobic layer. The applied films or coatings can then be evaluated according to a variety of tests as described below in order to characterize their relative degree of omniphobicity.

Contact Angle: Contact angles (see FIG. 1) are determined by applying a liquid droplet on a test coating surface that is stationary and horizontal with respect to gravity. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a volume of about 5 μl (e.g., about 3 μl to 10 μl), although the measured contact angle is not particularly sensitive to actual droplet volume in these ranges. Once applied to the test coating, the droplet can be visually interrogated through any suitable means to determine the contact angle (e.g., using conventional digital image photography and digital image analysis). Suitably, (cured) omniphobic composition coatings according to the disclosure have a water contact angle in a range from 90° to 120° or 130° (e.g., at least 90°, 95°, 100°, or 105° and/or up to 110°, 115°, 120° or 130°). Suitably, (cured) omniphobic composition coatings according to the disclosure have an oil contact angle in a range from 0° or 1° to 65° (e.g., at least 1°, 10°, 20°, or 30° and/or up to 40°, 50°, 60°, or 65°). The foregoing ranges are particularly applicable for smooth surfaces/coatings. In the case of coatings including fillers or other dispersed phase additives, the water and/or oil contact angles can be higher, for example up to 150°, 160°, or higher.

Sliding Angle: Sliding angles are determined by applying a liquid droplet on a test coating surface that is initially horizontal with respect to gravity. The test coating surface is then gradually ramped at a controlled/known angle relative to the horizontal plane. Droplets which do not initially spread will remain stationary on the test surface until the test surface is ramped to a sufficiently high angle to cause the droplets to slide down the ramped test surface. The test surface angle at which sliding begins is the sliding angle of the test coating. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a specified volume, which is generally about 75 μl (e.g., about 50 μl to 150 μl) for water and about 20 μl (e.g., about 5 μl to 40 μl) for oil. Once applied to the test coating, the droplet can be visually interrogated through any suitable means to determine the sliding angle (e.g., using conventional digital image photography and digital image analysis). Suitably, (cured) omniphobic composition coatings according to the disclosure have a water sliding angle in a range from 0° or 1° to 30° (e.g., at least 1°, 2°, 4°, 6°, or 8° and/or up to 10°, 15°, 20°, or 30°). Suitably, (cured) omniphobic composition coatings according to the disclosure have an oil contact angle in a range from 0° or 1° to 20° (e.g., at least 1°, 2°, 4°, 6°, or 8° and/or up to 10°, 12°, 15°, or 20°).

Scratch Resistance: Scratch resistance is evaluated on a scale of 1 (worst) to 10 (best) by attempting to scratch a test coating surface using materials of various hardness, such as a human fingernail, the corner/edge of a glass slide, a metal (e.g., stainless steel) knife, etc. The test surface is rated as "1" for a given scratching material if there is substantial damage or delamination of the test coating surface after being scratched. The test surface is rated as "10" for a given scratching material if there is no observable damage or marking on the test coating surface after being scratched. These qualitative numbers were obtained based on the criteria including: 1) the depth of the scratch, 2) is scratch damaging the surface, and 3) whether the scratch be felt if touched by hand.

Permanent Ink Resistance: Permanent ink resistance is evaluated on a scale of 1 (worst) to 10 (best) by applying an ink marking on a test coating surface using a permanent ink marker (e.g., SHARPIE permanent ink marker or equivalent) and then attempting to wipe off the marking using a tissue (e.g., KIMWIPE laboratory cleaning tissue or equivalent). The test surface is rated as "1" if all of the ink marking remains on the test coating surface after being wiped. The test surface is rated as "10" if all of the ink marking is removed from the test coating surface after being wiped. These numbers give an estimation of the ink-resistance, which are qualitatively assigned by taking two aspects in consideration: 1) the amount of ink left behind after a single wipe of the sample, and 2) the ink left behind after multiple wipes of the sample.

Example 1

Self-Healing and Self-Cleaning Omniphobic Polyurethanes

Example 1 provides illustrative self-healing and self-cleaning omniphobic polyurethanes using a hindered amine reversible polyfunctional linker according to the disclosure. This example illustrates a method for making semi-urethane coatings with combined self-healing and self-cleaning properties via a single formulation. The self-cleaning component is a poly(dimethyl siloxane) (PDMS), which is more affordable and has a smaller environmental footprint than conventional fluorinated materials. The obtained surfaces exhibit excellent anti-smudge properties against water-, oil- and ink, as well as striking optical clarity properties. These coatings even recover from cuts by a doctor blade within 10 min. The resultant films also showed good mechanical properties. This method is highly practical and versatile, as it provides a facile means to prepare coatings via a one-pot approach from commercially available materials.

Self-cleaning materials have potential for applications ranging from solar panels to anti-biofouling coatings. Omniphobic are mostly based on bioinspired models of lotus leaves, water strider legs, and pitcher plants. However, rough surfaces are often plagued with poor durability, limited clarity, and are prone to failure under pressure. The pitcher plant model has been widely used to develop smooth surfaces with remarkable water- and oil repellency. However, once such coatings are scratched or cut, they do not repair, and thus they need to be replaced with a new coating.

Self-healing coatings can recover from scratches and cuts on their surfaces and thus have lower maintenance costs and longer service-lives. Self-healing coatings (without self-cleaning properties) typically employ non-covalent interactions, coatings with trapped unreacted reagents, and dynamic covalent bonds. Coatings relying on non-covalent interactions typically have poor mechanical strength due to the weak nature of these interactions. Resultant coatings for a microencapsulation approach are translucent, which limits their applications as self-cleaning systems, particularly on substrates such as windows or display screens where optical clarity is required. Also, microencapsulated coatings can heal only once at the damaged site because of the exhaustion of encapsulated reagents during the healing of first damage. Although the dynamic covalent bond approach provides coatings with good optical clarity and can heal damage at the same site virtually for unlimited cycles, special chemical groups must be introduced to polymers to obtain the self-healing capacity for reversible covalent bonds, and such treatment is usually expensive, which limits its commercial viability. These materials possess good self-healing capabilities, but they lack self-cleaning properties and showed low mechanical strength.

Figure 7:
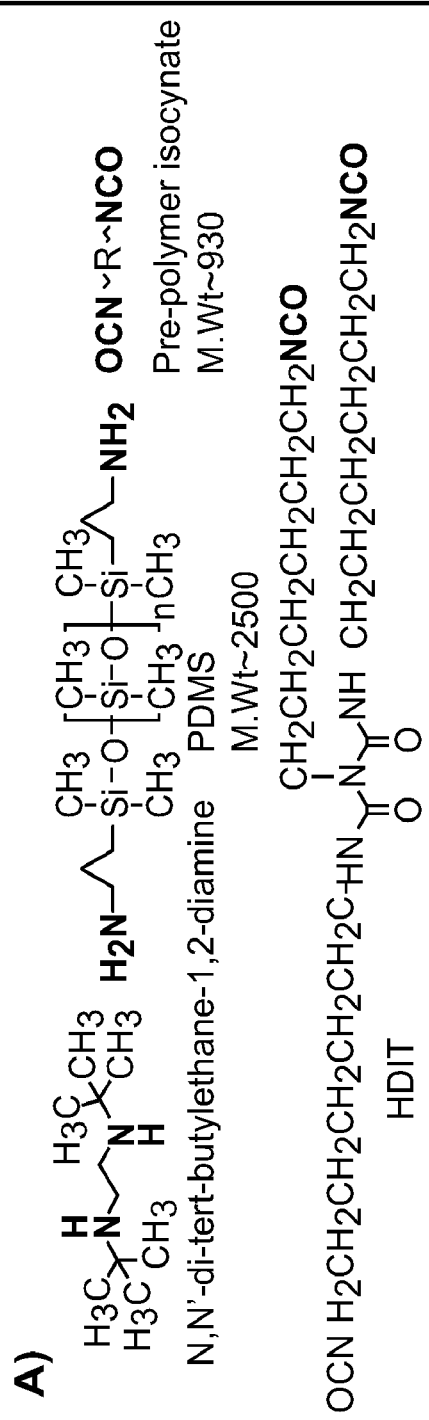
FIG. 7 illustrates components used to make a self-healing omniphobic coating according to the disclosure (panel A) and dynamic behavior of a bulky urea bond that contributes to self-healing properties (panel B).
Figure 7:
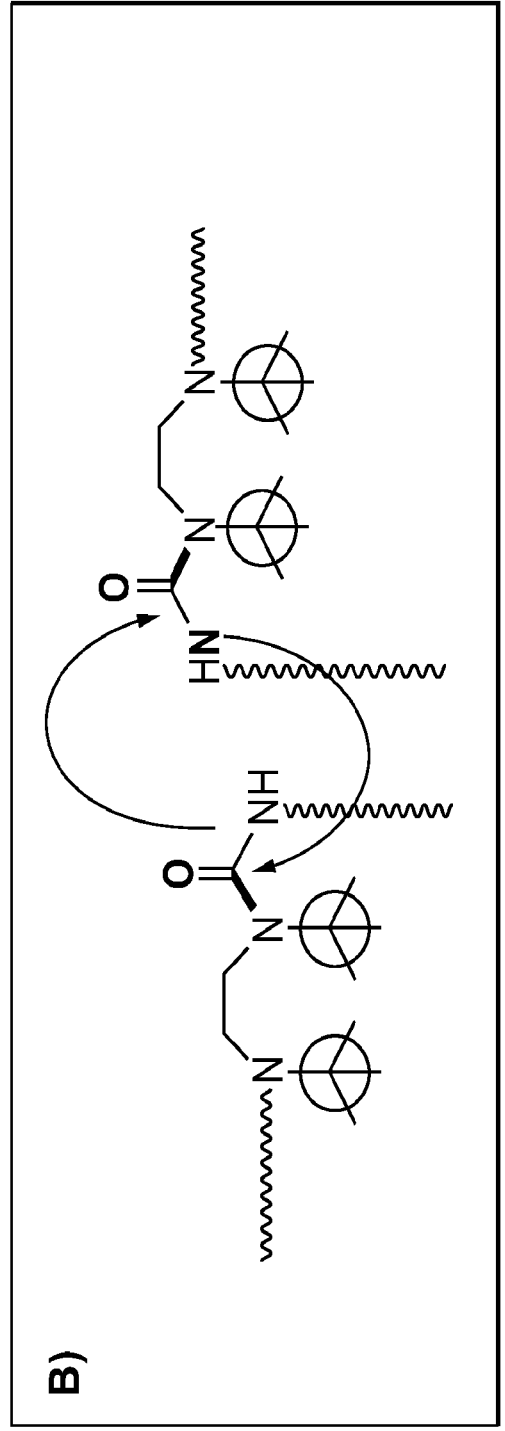

Summary: This example illustrated self-cleaning and self-healing optically clear coatings. A poly(urethane-urea) (PU) system bearing polydimethylsiloxane (PDMS) was used as the self-cleaning component. A diamine (N,N-di-tert-butyl-ethylene-diamine) was used as a reversible crosslinker to impart the self-healing properties to the polymer. A linear polyether diisocyanate prepolymer and an aliphatic polyisocyanate (HDIT) were are used to control the mechanical and optical properties. The self-healing and self-cleaning properties were adjusted by changing content of the bulky hindrance diamine and PDMS, respectively, such that a coating was obtained that possessed integrated performance that would be suitable for a wide range of conditions. FIG. 7 (panel A) shows components used in the coating. FIG. 7 (panel (B) shows dynamic behavior of a bulky urea bond that contributes to self-healing properties, for example self-healing interactions at a damaged interface on a coating on a substrate.

Materials: An isocyanate-terminated PU-prepolymer (Mn=~930 g/mol, NCO content=9.03 wt %) and hexamethylene diisocyanate trimer (HDIT, NCO content=17.36%) were supplied by a manufacturer and used as received. Bis(3-aminopropyl)-terminated polydimethylsiloxane (PDMS-2.5K, Mn=2500 g/mol, Sigma-Aldrich), acetone (Thermo Fisher Scientific), tetrahydrofuran (THF; Sigma Aldrich), and N,N'-di-tert-butylethylenediamine (Sigma-Aldrich, 98%) were purchased and used without further purification.

Synthesis of PU: In a typical experiment, a PU-prepolymer (1.0 g, 2.8 mmol) was dissolved in acetone (2.0 mL) in a 20 mL vial and cooled to 5° C. N,N'-di-tert-butylethylenediamine (0.3 g, 3.4 mmol of amine groups) dissolved in THF (1.0 mL) was added dropwise to the above solution. Some of this solution (1.0 mL) was cast onto a glass slide (2.54 cm×7.62 cm) and kept at room temperature for 3 h, followed by heating at 50° C. for 5 h to remove any residual solvent traces prior evaluation.

Synthesis of HDIT-PU: In a typical experiment, HDIT (0.06 g, 0.3 mmol) was dissolved in THF (0.5 mL) in a vial and cooled to 5° C. N,N'-di-tert-butylethylenediamine (0.30 g, 3.4 mmol) dissolved in THF (1.0 mL) was added dropwise to the above solution. After proper mixing, the PU-prepolymer (1.0 g dissolved in 2.0 mL of acetone, 2.3 mmol) was added to this solution. It was important that the addition of the PU-prepolymer was performed rapidly, whereas the slow addition would cause gel formation. Another batch of HDIT (0.12 g, 0.57 mmol, dissolved in 0.5 mL of THF) was added to the reaction mixture. Some of this solution (1.0 mL) was cast onto a glass slide (2.54 cm×7.62 cm) and kept at room temperature for 3 h, followed by heating at 50° C. for 5 h to remove all of the residual solvent prior to evaluation.

Synthesis of HDIT-PU-PDMS: In a typical experiment, HDIT (0.06 g, 0.3 mmol) was dissolved in THF (0.5 mL) in a vial and cooled to 5° C. A mixture of the desired amount of PDMS (5-80 mg) and a fixed amount of N,N'-di-tert-butylethylenediamine (0.30 g in 1.0 mL of THF, 3.4 mmol) was added dropwise to the above solution. The PU-prepolymer (1.0 g, 2.8 mmol, dissolved in 2.0 mL of acetone) was added into the above solution. A second batch of HDIT (0.12 g, 0.57 mmol dissolved in 0.5 mL of THF) was added to the above reaction mixture. A portion of the above solution (1.0 mL) was then cast onto a glass slide (2.54 cm×7.62 cm). The coating was dried in a similar manner as described above for the synthesis of HDIT-PU.

The compositions of each sample for Example 1 are listed in Table 1 below.

TABLE 1

Coating Compositions for Example 1

| Sample ID | PU-prepolymer (mg) | N,N'-di-tert-butylethylenediamine (mg) | HDIT (mg) | PDMS (approximate wt %) |
|---|---|---|---|---|
| PU | 1000 | 300 | NA | NA |
| HDIT-PU | 1000 | 300 | $60^a + 120^b$ | NA |

TABLE 1-continued

Coating Compositions for Example 1

| Sample ID | PU-prepolymer (mg) | N,N'-di-tert-butylethylenediamine (mg) | HDIT (mg) | PDMS (approximate wt %) |
|---|---|---|---|---|
| HDIT-PU-PDMS5 | 1000 | 300 | $60^a + 120^b$ | 5 mg (0.33%) |
| HDIT-PU-PDMS10 | 1000 | 300 | $60^a + 120^b$ | 10 mg (0.66%) |
| HDIT-PU-PDMS20 | 1000 | 300 | $60^a + 120^b$ | 20 mg (1.33%) |
| HDIT-PU-PDMS40 | 1000 | 300 | $60^a + 120^b$ | 40 mg (2.66%) |
| HDIT-PU-PDMS60 | 1000 | 300 | $60^a + 120^b$ | 60 mg (4.00%) |
| HDIT-PU-PDMS80 | 1000 | 300 | $60^a + 120^b$ | 80 mg (5.33%) |

Notes: HDIT amounts are indicated as amount added in first batch (a) and amount added in second batch (b). The number in the sample ID represents the amount of PDMS used in the formulation. For example, HDIT-PU-PDMS40 carries 40 mg of the PDMS.

Microscopic analysis of self-healing properties: An optical microscope (OLYMPUS SZX12 STEREOZOOM Microscope) was used to observe the self-healing behavior of the coatings. The healing properties of these samples were checked at 40, 50, 60 and 70° C. (after heating for 10 min at each temperature) and their images were captured.

Contact and sliding angle measurements: In this example, a goniometer (Ramé-Hart Instrument Co., 100-25A) was used to measure the static contact angles of the PU coating samples. The contact angles of these coatings were recorded using deionized water, canola oil and hexadecane as test liquids with ~10 μL droplet volumes. The reported values represent the average of three measurements taken at different spots on the same specimen. The sliding angles of the coatings was measured on a homemade sliding angle machine, using droplets of deionized water (50 μL), cooking oil (canola oil; 10 μL) and hexadecane (10 μL), respectively. The reported angles represented the average of three measurements performed on the same sample.

Abrasion tests: A magnetic stir bar with a net weight of 13.01±0.09 g was wrapped in a cotton fabric (surface area: 0.77 cm²) and placed on the sample that is equivalent to pressure of 1100 Pascal on the surface. The selected samples were rubbed for 5000 cycles and the contact angles were measured before and after the abrasion tests.

Optical transmittance: The percent transmittance (% T) of the PU-coated samples were recorded using a Perkin Elmer LAMBDA 25 UV-Vis spectrometer. HDIT-PU (PU without PDMS) was used as a reference. The reported % T values correspond to those observed at a wavelength of 550 nm.

FTIR analysis: A Shimadzu IRAFFINITY-1S spectrometer was used to record ATR-FTIR spectra of each sample. ATR-FTIR spectra of the selected PU samples were recorded to confirm the presence of PDMS, and also to confirm the consumption of the NCO peaks. The IR spectra further confirmed effective incorporation of PDMS into the PU.

Differential Scanning calorimetry (DSC): DSC analysis of the selected samples were performed with a TA Instruments Q100 using 5-10 mg of sample. Heating was performed at a rate of 10° C./min from −30 to 200° C.

Tensile properties: Tensile properties of the HDIT-PU and HDIT-PU-PDMS40 were measured using an Instron Series 5565 instrument via the ASTM D882 protocol. Films were prepared on a silicon pad and cut into sections with the dimensions of 7.0 cm long and 2.5 cm wide. The gauge length was set as 2.5 cm. The rate of separation of the two jaws of the instrument was 50 mm/min.

Results: The self-healing feature of the coating is based on dynamic urea bonds, which are formed by bulky amine and isocyanate moieties. The PU sample in Table 1 had the best self-healing performance since it healed in only 10 min at 40° C., due to the bulky groups on the urea bond that was formed by the reaction of N,N'-di-tert-butylethylenediamine and NCO. However, due to the polyether nature of the PU-prepolymer as well as the very weak hydrogen-bonding due to the hindered polyurea functionalities, the mechanical properties were too weak for use as a coating. To address this problem, HDIT-PU was prepared so that the mechanical properties of the coatings were reinforced by HDIT (hexamethylene diisocyanate trimer). As the crosslinker HDIT formed reversible bonds with the bulky amine, HDIT-PU was thus able to undergo self-healing in 10 min at 60° C. despite its good mechanical properties.

Polydimethylsiloxane (PDMS), a non-fluorinated material, was then added to provide a low surface energy to render self-cleaning properties to the system. Significant self-cleaning properties for the PU system were obtained even at low PDMS loadings. Gradually increasing the amount of PDMS had no negative impact on the self-healing capabilities of these poly(urethane-urea)s.

FIG. 8 includes microscopy illustrating self-healing behavior for coating compositions in Example 1. Coatings were tested by cutting a coating and then observing the coating surface as a function of time and temperature. The cuts were made with a razor blade. Each cut was about 40 μm deep and about 30-40 μm wide. The cuts were measured using an OMAX 0.01 mm Microscope Camera Calibration Slide. As seen in FIG. 8, almost all of the samples underwent complete self-healing within 10 min at 60° C., although some of them exhibited scars after healing, leaving only a few air bubbles that became trapped during the healing process.

DSC was used to identify thermal transitions in the coating samples. The DSC curve of PU showed an endothermic peak starting about 45° C. that does not return to the baseline, which indicates the onset of cleavage of the dynamic urea bond that was initially formed from hindered amines and isocyanate. This peak is endothermic due to the energy required to cleave the urea bond formed as result of bulky amine and NCO reaction. This is also consistent with the self-healing of the PU coatings at 40° C. In the case of HDIT-PU, the endothermic peak also started at about 45° C. without returning to the baseline. This endothermic peak is broader and more intense than that of the PU sample because HDIT-PU is a cross-linked sample that upon cleavage of the urea bond allowed the initially cross-linked chains to have more freedom in the matrix; this relatively more freedom for the polymer chains requires a larger amount of energy than the crosslinked (frozen chain) system. In the case of HDIT-PU-PDMS, the heating caused the bonds in the bulky urea to cleave, which lead to the intense endothermal peak. Some heterogeneity was apparent based on the multiple endothermic peaks, such as the peak near about 160° C., which revealed that two kinds of urea bonds existed in the system. It is believed that the second endothermic corresponds to the breakage of unhindered-urea bonds formed by the primary amine of PDMS-NH2 and NCO.

The coatings were tested for their anti-smudge properties and the results are summarized in Table 2. The water and oil contact angles increased with increasing the PDMS amount because of the strong water- and oil-repellent nature of PDMS. Uncrosslinked PU coatings are hydrophilic with contact angles of less than 90° for water. Meanwhile, the coatings with HDIT showed water contact angles greater than 90° that further increased with higher PDMS contents. Non-polar test liquids such as canola oil and hexadecane could not be measured on PU as these liquids wet the surface. However, for the rest of the coatings, the contact angles for "canola oil" and hexadecane steadily increased with greater PDMS contents. However, a slight difference in the values was observed in the case of hexadecane. The water contact angles exceeded 90° for all samples except for PU. While the maximum contact angle observed with hexadecane was 30.8°, which is consistent with other anti-smudge urethane coatings.

TABLE 2

Contact Angles for Example 1

| Sample ID | Water contact angle (°) | Oil contact angle (°) | Hexadecane contact angle (°) |
| --- | --- | --- | --- |
| PU | 81.7 ± 3.2 | NA* | NA* |
| HDIT-PU | 95.5 ± 0.2 | 53.6 ± 2.7 | 27.5 ± 2.0 |
| HDIT-PU-PDMS5 | 97.7 ± 0.8 | 55.8 ± 1.1 | 26.8 ± 0.8 |
| HDIT-PU-PDMS10 | 97.9 ± 0.4 | 57.2 ± 0.7 | 27.2 ± 0.2 |
| HDIT-PU-PDMS20 | 98.2 ± 0.3 | 58.2 ± 0.2 | 27.9 ± 0.6 |
| HDIT-PU-PDMS40 | 98.2 ± 0.4 | 58.4 ± 0.6 | 26.4 ± 0.2 |
| HDIT-PU-PDMS60 | 98.8 ± 0.2 | 58.7 ± 0.8 | 30.2 ± 0.2 |
| HDIT-PU-PDMS80 | 99.5 ± 0.9 | 59.0 ± 0.2 | 30.8 ± 0.7 |

Note:
"*"indicates that the surface was wet by the test liquid.

Smooth omniphobic coatings desirably have low sliding angles. Therefore, the water and oil sliding angles were tested and the results are summarized in Table 3. The sliding angles of water continuously improved with increasing amounts of PDMS and reached the lowest value for the HDIT-PU-PDMS40 sample. A further increase in the PDMS content from 40 to 80 mg did not yield any significant change. Cooking oil and hexadecane left trails on the surfaces of the PU and HDIT-PU coatings. Meanwhile, all three of the test liquids (water, cooking oil and hexadecane) readily slid off each of the PDMS-containing samples. Hexadecane left noticeable trails on the PU and HDIT-PU coatings. Meanwhile, the incorporation of PDMS prevented the droplets from leaving trails on the HDIT-PU-PDMS40 film. Thus, the incorporation of PDMS provided the surfaces with excellent repellency against polar and non-polar solvents.

TABLE 3

Sliding Angles for Example 1

| Sample ID | Water (°) | Oil (°) | Hexadecane (°) |
| --- | --- | --- | --- |
| PU | 44 ± 4 | NA | NA |
| HDIT-PU | 41 ± 2 | NA | NA |
| HDIT-PU-PDMS5 | 38 ± 1 | 28 ± 1 | 17 ± 1 |
| HDIT-PU-PDMS10 | 36 ± 1 | 25 ± 1 | 14 ± 1 |
| HDIT-PU-PDMS20 | 34 ± 1 | 23 ± 1 | 12 ± 1 |
| HDIT-PU-PDMS40 | 33 ± 1 | 22 ± 1 | 12 ± 1 |
| HDIT-PU-PDMS60 | 33 ± 1 | 22 ± 1 | 12 ± 1 |
| HDIT-PU-PDMS80 | 33 ± 1 | 21 ± 1 | 12 ± 1 |

Strong mechanical durability is highly desirable for real-world applications. Three tests including abrasion/rubbing-, scratch-, and tensile-tests were used to evaluate the mechanical properties of the films. The rubbing test was used to determine whether the HDIT-PU-PDMS40 sample retained its liquid repellency after 5000 abrasion cycles at 1100 Pascal. The contact angles were measured before and the rubbing tests. The contact angles for water and cooking oil remained essentially identical before and after the rubbing test, while there was a slight decrease in the case of hexadecane. Specifically, the water contact angle was 98.2°±0.4° before and 97.8°±0.5° after 5000 abrasion cycles, the oil contact angle was 58.4°±0.6° before and 57.8°±0.4° after 5000 abrasion cycles, and the hexadecane contact angle was 26.4°±0.2° before and 22.4°±0.5° after 5000 abrasion cycles. This clearly indicates that the film had good durability against rubbing.

Selected PU samples were also subjected to scratch tests using a fingernail and the results are summarized in Table 4. Due to the lack of stronger hydrogen bonding between the urea moieties caused by the sterically hindered bulky tert-butyl group, the PU coating showed the worst scratch-resistance against fingernails. HDIT is a trimer of hexamethylene diisocyanate, which has three NCO moieties that acts as a crosslinker, and thus enhances the scratch-resistance of HDIT-PU in comparison with PU alone. However, the hydrogen bonding between the macromolecules is also very important for the mechanical properties of polyurethanes and polyureas. It was evident from the scratch test that coatings with higher PDMS contents exhibited better scratch-resistance because the PDMS described herein is a polysiloxane diamine (on account of its 3-aminopropyl terminating groups) that lacks steric hindrance, whereas the N,N'-di-tert-butylethylenediamine is a hindered diamine. PDMS also serves as an anti-smudge agent for the coating, and it increased the water- and oil-repellency as well as the scratch-resistance without compromising the self-healing properties.

TABLE 4

Scratch Resistances for Example 1

| Sample ID | Scratch Resistance |
| --- | --- |
| PU | 1 |
| HDIT-PU | 2 |
| HDIT-PU-PDMS5 | 3 |
| HDIT-PU-PDMS10 | 3 |
| HDIT-PU-PDMS20 | 3 |
| HDIT-PU-PDMS40 | 5 |
| HDIT-PU-PDMS60 | 6 |
| HDIT-PU-PDMS80 | 7 |

Tensile tests were also conducted on three selected samples including PU, HDIT-PU, and HDIT-PU-PDMS40. Since HDIT-PU-PDMS40 had the best overall clarity, self-healing capabilities, and self-cleaning performance among the PDMS-containing samples, it was thus selected for the tensile test. Polyureas made from bulky hindered amines are typically very flimsy, with a tensile strength below 1 MPa. Also, the PU-prepolymer possessed an ether backbone, and in the absence of any crosslinker, it was not possible to prepare a specimen for tensile tests and therefore we were unable to evaluate its tensile properties. HDIT-PU has a much better tensile stress of 2.3 MPa at the yield point due to the incorporation of HDIT. However, its tensile stress was low, with a value of 0.7 MPa at the breakpoint. HDIT-PU-PDMS40 had a tensile stress of 10.1 MPa at the yield point and this value continued to increase to 14.9 MPa at the breaking point. The tensile strain at the breaking point was 366%, which is a typical value for a poly(urethane-urea). This data confirmed that an increase in the PDMS content helped to enhance the mechanical properties by offering strong H-boding of the unhindered urea moieties. It is worth noting that the incorporation of PDMS improved the anti-smudge properties without compromising the critical self-healing performance.

TABLE 5

Tensile Properties for Example 1

| Sample ID | Tensile strain at Break (%) | Tensile stress at Break (MPa) | Tensile stress at Yield (MPa) | Modulus (MPa) |
|---|---|---|---|---|
| PU | NA | NA | NA | NA |
| HDIT-PU | 100 ± 51 | 0.7 ± 0.3 | 2.3 ± 0.9 | 49 ± 32 |
| HDIT-PU-PDMS40 | 366 ± 101 | 14.9 ± 8.6 | 10.1 ± 1.8 | 190 ± 69 |

Clear coatings are desirable as they can be used for many applications including, but not limited to, glass coatings, sensors for autonomous vehicles, solar panels, and coatings for windows. To ensure the clarity of the coating, HDIT has been added in two batches. It was observed that one batch addition of HDIT yielded hazy films. The first batch of the HDIT was added to increase the compatibility of PDMS with the matrix by grafting onto the PU-prepolymer. A small amount of HDIT can react with PDMS and a hindered diamine firstly to form an amino-terminated prepolymer, so that the prepolymer is then compatible with the rest of polar isocyanates that will be subsequently added. The second batch of HDIT was then added to provide a clear coating by enabling crosslinking. In the absence of the HDIT crosslinker, the PDMS chains can undergo phase separation as the $T_g$ of the matrix is below the ambient temperature due to the polyether nature of the PU-prepolymer. In compliance with these steps, the transmittance at 550 nm was measured via ultraviolet-visible spectroscopy (UV-Vis). Due to its good transparency, HDIT-PU was set as a reference with a 100% transmittance. The transmittance of the other samples is shown in Table 6. As the PDMS content increased in the coating formulations, almost no noticeable change in the clarity was observed, demonstrating the excellent optical properties of the coatings.

TABLE 6

Transmittances for Example 1

| Sample ID | % Transmission |
|---|---|
| PU | 99.79 |
| HDIT-PU | 99.63 |
| HDIT-PU-PDMS5 | 99.67 |

TABLE 6-continued

Transmittances for Example 1

| Sample ID | % Transmission |
|---|---|
| HDIT-PU-PDMS10 | 99.57 |
| HDIT-PU-PDMS20 | 99.40 |
| HDIT-PU-PDMS40 | 99.43 |
| HDIT-PU-PDMS60 | 99.59 |
| HDIT-PU-PDMS80 | 99.01 |

Example 2

Self-Healing and Self-Cleaning Omniphobic High-Modulus Polyurethanes

Example 1 provides illustrative self-healing and self-cleaning omniphobic polyurethanes using an aromatic hydroxy reversible polyfunctional linker according to the disclosure. This example illustrates a method for making phenolic polyurethane coatings with combined properties of self-healing, self-cleaning, high mechanical strength and clarity. PDMS is incorporated to render the coating anti-smudge. Propyl gallate was used as a reversible crosslinker to render the self-healing properties to the polymer. To tune the balance of optical and mechanical properties of the polymer, a linear polyether diisocyanate (prepolymer) and an aliphatic polyisocyanate were used. The self-healing and self-cleaning properties were adjusted by changing the concentrations of the PDMS and the amount of crosslinker. The resultant coatings were evaluated for their self-cleaning and self-healing performance as well as their mechanical properties were determined. The obtained films showed excellent anti-smudge properties as evident from their water, oil, ink and hexadecane repellencies. In addition, these coatings have excellent clarity. Furthermore, these coatings can heal from cuts or scratches in a short period when heated at 120° C. due to the reversible nature of urethane bond formed between OH of the propyl gallate and isocyanates. Incorporation of PDMS surprisingly also enhanced the tensile strength compared to phenolic polyurethane films alone. The materials used for this self-healing and self-cleaning coatings are commercially available at affordable cost.

Materials: An isocyanate-terminated PU-prepolymer (Mn=~930 g/mol, NCO content=9.03 wt %) and hexamethylene diisocyanate trimer (HDIT, NCO content=17.36%) were supplied by a manufacturer and used as received. Propyl Gallate (Sigma Aldrich) and PDMS-2.5K ($M_n$=2500 g/mol, Sigma-Aldrich) were analyzed by 1H-NMR prior to use. US3 is a commercial paint solvent, which is mixture of esters 2-btuanone, 2-pentanone, ethoxy propionate, and n-butyl acetate was used as solvent.

Synthesis of self-healing PU (control): PU-prepolymer (1.645 g, NCO content is 9.03%) was added into a 20 mL vial, followed by the addition of propyl gallate (0.25 g, 1.18 mmol, pre-dissolved in 1.0 mL US3). The resultant reaction mixture was stirred at 90° C. for 1 hour. Then, 1.0 mL of this solution was cast on a glass slide (2.54×7.62 cm²) and kept at room temperature for 5-6 h, followed by heating at 120° C. for 2 h to cure the coating.

Synthesis of self-healing HDIT-PU (control): PU-prepolymer (1.645 g, NCO content is 9.03%) was dissolved in US3 (1.5 mL), propyl gallate (0.25 g, 1.18 mmol dissolved in 1.0 mL US3) and HDIT (100 mg, dissolved in 0.5 mL US3) were charged to 20 ml vial at room temperature. The resultant reaction mixture was stirred at 90° C. for 1 hour. Then, 1.0 mL of this solution was cast on a glass slide (2.54×7.62 cm²) and kept them at room temperature for 5-6 h, followed by heating at 120° C. for 2 h to cure the coating.

Synthesis of self-healing and self-cleaning HDIT-PU-PDMS: In a representative experiment, a 20 mL vial was charged with PU-prepolymer (1.645 g, NCO content is 9.03%) dissolved in US3 (1.5 mL), propyl gallate (0.25 g, 1.18 mmol) dissolved in US3 (1.0 mL) and HDIT (UH80) (100 mg, dissolved in 0.5 mL US3). The temperature of the reaction mixture was increased to 90° C. and the desired amount of PDMS-2.5K were added dropwise to the reaction mixture and stirred for 1 hour. 1.0 mL of this solution was cast on a glass slide (2.54×7.62 cm2) and kept them at room temperature for 5-6 h, followed by heating at 120° C. for 2 h to remove all the residual solvent prior to evaluation and testing.

The composition of each sample is listed in the Table 7. The sample "PU" was prepared by reacting propyl gallate and PU-prepolymer. The sample "HDIT-PU" was prepared by reacting propyl gallate, PU-prepolymer and HDIT. HDIT is a crosslinker that was used to enhance the mechanical properties. "HDIT-PU-PDMS-n" represents formulations that carry propyl gallate, PU-prepolymer, and HDIT along PDMS. The value "n" represents the amount of PDMS-2.5k in "mg" added into the formulation. The PDMS wt % is also shown in Table 7. FIG. 9 illustrates a chemical reaction between propyl gallate, PU-prepolymer, HDIT and PDMS-2.5K.

TABLE 7

Coating Compositions for Example 2

| Sample ID | PU Pre-polymer | Propyl Gallate | HDIT | PDMS 2.5K (~weight %) |
|---|---|---|---|---|
| PU | 1.645 g | 250 mg | 0 | 0 |
| HDIT-PU | 1.453 g | 250 mg | 100 mg | 0 |
| HDIT-PU-PDMS-20 | 1.453 g | 250 mg | 100 mg | 20 mg (1.0%) |
| HDIT-PU-PDMS-40 | 1.453 g | 250 mg | 100 mg | 40 mg (2.0%) |
| HDIT-PU-PDMS-60 | 1.453 g | 250 mg | 105 mg | 60 mg (3.0%) |
| HDIT-PU-PDMS-80 | 1.453 g | 250 mg | 105 mg | 80 mg (4.0%) |
| HDIT-PU-PDMS-100 | 1.453 g | 250 mg | 110 mg | 100 mg (5.0%) |
| HDIT-PU-PDMS-150 | 1.453 g | 250 mg | 110 mg | 150 mg (7.5%) |
| HDIT-PU-PDMS-200 | 1.453 g | 250 mg | 115 mg | 200 mg (10.0%) |
| HDIT-PU-PDMS-250 | 1.453 g | 250 mg | 120 mg | 250 mg (12.5%) |
| HDIT-PU-PDMS-300 | 1.453 g | 250 mg | 125 mg | 300 mg (15.0%) |

Microscopic analysis of self-healing properties: To study the self-healing behavior of the coatings, an optical microscope (Olympus SZX12 STEREOZOOM Microscope) was used. The self-healing behavior was recorded for ten different samples (Table 7). A fresh cut was made on the coating and the microscopic image was recorded immediately. The cuts were made with a razor blade. Each cut was about 40 μm deep and about 30-40 μm wide. These coatings (with cuts), were placed at 120° C. for 10 min and their images were captured after healing for 10 min.

Contact and sliding angle measurements were performed as above for Example 1.

Abrasion tests were performed as above for Example 1.

Optical transmittance measurements were performed as above for Example 1.

FTIR analysis measurements were performed as above for Example 1. ATR-FTIR spectral analysis confirmed the curing of urethane coatings.

DSC measurements were performed as above for Example 1, except that the heating was performed at a rate of 10° C./min from −30 to 240° C.

Tensile properties: An Instron Series 5565 instrument was used to measure the tensile properties using ASTM D882 procedure. For sample, 5-6 films were prepared with approximate thickness of 100-150 μm that were 2.5 cm wide and 7.0 cm long. The distance between the two jaws was adjusted to 5.0 cm. The rate of film stretching was 5.0 cm/min.

Thermo-Gravimetric Analysis (TGA): Gravimetric analysis was performed with a TGA Instruments Q50 analyzer. About 8-11 mg of the total sample were used for the analysis with heating range rate of 25 to 600° C. using a heating ramp of 10° C./min.

Results: The self-healing of phenolic polyurethane is based on the dynamic phenolic urethane bonds from isocyanates and phenolic hydroxyls. These reversible urethane bonds of thermosetting polyurethane network can be thermally self-repaired at 120° C. in less than 10 minutes. FIG. 10 includes photographs illustrating the self-healing behavior for the coating compositions of Example 2. The PU sample in Table 7 having the best self-healing performance since it healed in only 8-10 min at 120° C. Similarly, HDIT-PU samples were healed at 120° C. within 10 min because the reaction of NCO of HDIT and phenolic group having the same dynamic reversible bond as in PU. Interestingly, a gradual increase of the amount PDMS in the HDIT-PU-PDMS coatings have no negative impact on the self-healing capabilities. For example, HDIT-PU-PDMS underwent almost complete self-healing within 10 min at 120° C. even at 5 wt % of PDMS loadings (HDIT-PU-PDMS-100 in FIG. 10). In some cases, scars and air bubbles are left behind at the healing sites possibly caused by trapping of air during the healing process.

Figure 11:
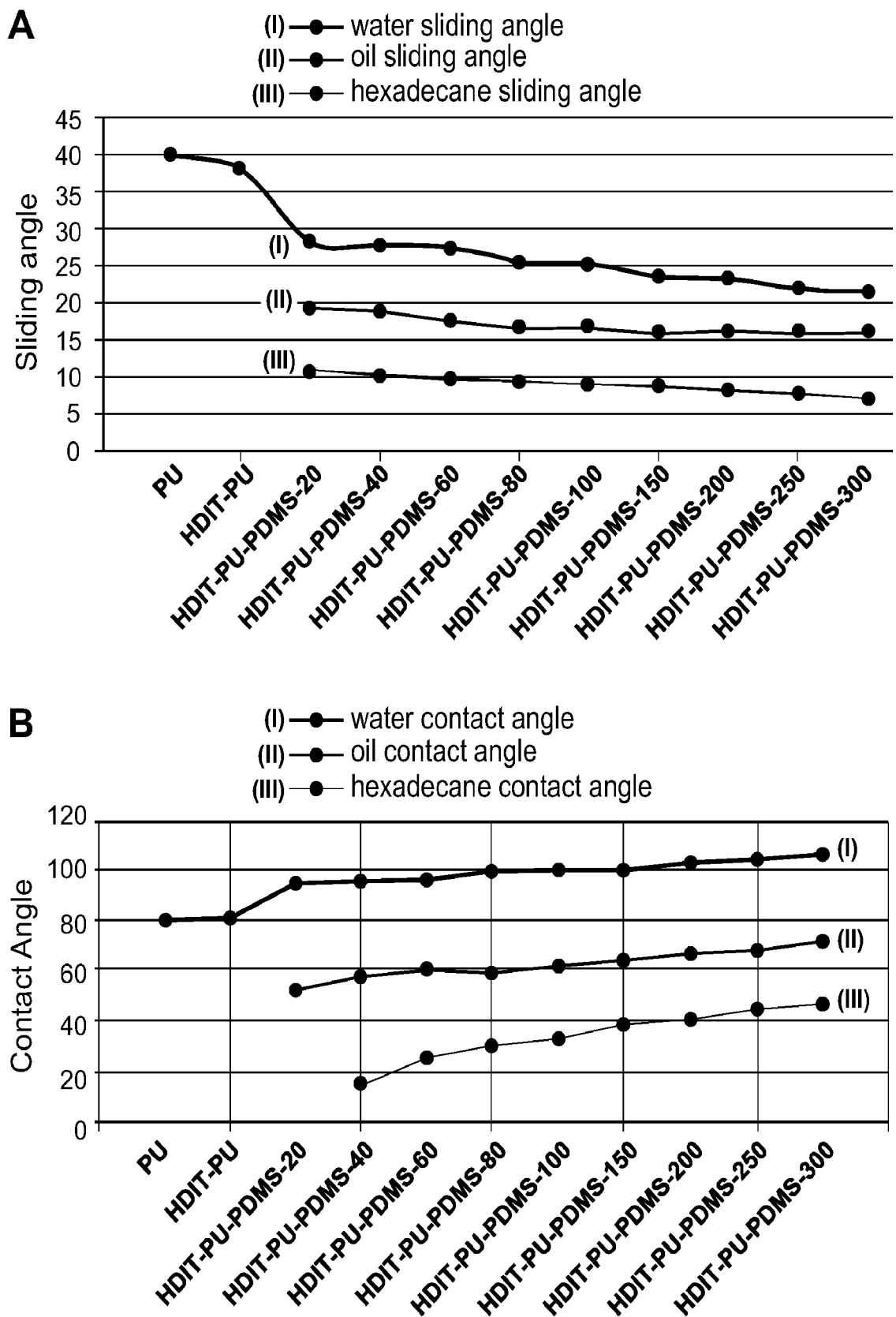
FIG. 11 includes graphs illustrating sliding angles (panel A) and contact angles (panel B) for self-healing omniphobic coating according to the disclosure.

This example illustrates the combination of self-cleaning omniphobicity and self-healing properties in the PU materials. The self-cleaning properties of the coatings was characterized by measuring their water and oil sliding angles (FIG. 11). The sliding angles of water and oil continuously improved with increasing amounts of PDMS and reached their best (lowest) sliding value for the HDIT-PU-PDMS-250 sample. A further increase in the PDMS content has a less significant change on the sliding angles, except for hexadecane where the angles kept improving with increasing amounts of PDMS in the formulations.

The obtained coatings were tested for their anti-smudge properties. Both the water and oil contact angles increased with the incorporation of greater quantities of PDMS because of the strong water- and oil-repellent nature of silicone containing polymers. Uncrosslinked PU coatings are hydrophilic with contact angles of around 80° for water. Meanwhile, the coatings with HDIT showed water contact angles greater than 80° that further increased with higher PDMS contents. Non-polar test liquids such as canola oil and hexadecane could not be measured on PU as these liquids wets the surfaces. However, for the rest of the coatings, the contact angles for canola oil and hexadecane steadily increased with greater PDMS contents. However, a slight difference in the values was observed in the case of hexadecane. The water contact angles exceeded 90° for all samples except for the samples without PDMS. While the maximum contact angle observed with hexadecane was more than 45°, which is a great improvement compared to that of samples containing 40 mg PDMS (less than 20°).

The sliding behavior of water, cooking oil, and hexadecane were evaluated on the surfaces of PU, HDIT-PU and HDIT-PU-PDMS. All three of the test liquids (water, cooking oil and hexadecane) readily slid-off from the PDMS-containing samples. In the absence of PDMS, hexadecane and cooking oil left trails on the PU and HDIT-PU coatings suggesting their poor self-cleaning properties. Meanwhile, the incorporation of PDMS prevented the droplets from leaving trails on the PDMS-containing films. Thus, the incorporation of PDMS provided the surfaces with excellent repellency against polar (water) and non-polar (oil and hexadecane) solvents.

To test the mechanical durability of the films, abrasion and tensile tests were performed. The abrasion tests was used to determine whether HDIT-PU-PDMS sample retained its liquid repellency after 5000 abrasion cycles under 1100 Pascal. The contact angles were measured before and after the rubbing tests for HDIT-PU-PDMS-40. The contact angles for water, hexadecane and cooking oil remained essentially same before and after the rubbing test. Table 8 presents the contact angles for PU, HDIT-PU, HDIT-PU-PDMS-100, HDIT-PU-PDMS-200, and HDIT-PU-PDMS-300. In all cases, the before and after rubbing tests, the contact angles remained almost unchanged; thus suggesting that the film had good durability against rubbing.

Tensile tests were also conducted for five selected samples including PU, HDIT-PU, HDIT-PU-PDMS-100, HDIT-PU-PDMS-200 and HDIT-PU-PDMS-300. The tensile property measurements are summarized in Table 9. As PU is a polyurethane based on propyl gallate and polytetrahydrofuran diisocyanate (polyTHF) prepolymer, the polyether backbone of polyTHF has very low glass transition temperature and thus higher flexibility. Also, in the presence of bulky phenolic on the urethane bond, the urethane lacks strong internal hydrogen bonding; thus, it had a lower tensile stress of 2.2 MPa. HDIT-PU had a much better tensile stress of 8.5 MPa at the yield point due to the incorporation of crosslinker HDIT. In the case of HDIT-PU, the tensile stress was still low, with a value of 5.7 MPa at the break point despite the presence of a crosslinker. It is because, besides crosslinker, hydrogen bonding between the macromolecules is critical for good mechanical properties of polyurethanes, which is not very strong for HDIT-PU due to presence of bulky phenyl group on the urethane bond. HDIT-PU-PDMS-100 had a tensile stress of 11.4 MPa at the yield point and this value continued to increase to 10.9 MPa at the breaking point. The tensile strain at the breaking point was 314.2%, which is a typical value for a poly(urethane-urea). When PDMS was increased to 200 mg in the sample, HDIT-PU-PDMS-200 had a further tensile property improvement, whose tensile stress at the yield point reach 19.6 MPa. This data confirmed that an increase in the PDMS content helped to enhance the mechanical properties by offering strong H-bonding of the unhindered urea moieties. It is worth noting that the incorporation of PDMS improved the anti-smudge properties without compromising the critical self-healing performance. However, increasing further PDMS content such as in HDIT-PU-PDMS-300, the tensile stress at the yield point decreased to 16.8 MPa. This means above a certain level, PDMS starts to turn the material less stiffer due to the PDMS rubbery nature, which is evident from the highest tensile strain of HDIT-PU-PDMS-300 among the tested samples.

TABLE 8

Contact Angles Pre- and Post-Rubbing for Example 2

| Sample ID | Water | | Oil | | Hexadecane | |
|---|---|---|---|---|---|---|
| | before rubbing | after rubbing | before rubbing | after rubbing | before rubbing | after rubbing |
| PU | 79.3 ± 0.2 | 79.9 ± 0.6 | NA | NA | NA | NA |
| HDIT-PU | 81.7 ± 0.3 | 81.9 ± 0.3 | NA | NA | NA | NA |
| HDIT-PU-PDMS-100 | 100.4 ± 0.4 | 99.5 ± 1.4 | 61.9 ± 3.1 | 62.1 ± 1.8 | 32.8 ± 0.9 | 33.2 ± 0.8 |
| HDIT-PU-PDMS-200 | 102.7 ± 0.6 | 102.9 ± 0.9 | 66.4 ± 1.3 | 65.6 ± 0.6 | 40.5 ± 1 | 40.0 ± 0.4 |
| HDIT-PU-PDMS-300 | 107.2 ± 0.7 | 106.9 ± 0.6 | 71.5 ± 1.4 | 71.8 ± 0.8 | 45.8 ± 1.44 | 45.2 ± 1.6 |

TABLE 9

Tensile Properties for Example 2

| Sample ID | Tensile strain at Break (%) | Tensile stress at Break (MPa) | Tensile strain at Yield (%) | Tensile stress at Yield (MPa) | Modulus (MPa) |
|---|---|---|---|---|---|
| PU | 582.5 | 1.9 | 564.9 | 2.2 | 0.6 |
| HDIT-PU | 252.8 | 5.7 | 225.6 | 8.5 | 9.5 |
| HDIT-PU-PDMS-100 | 314.2 | 10.9 | 313.1 | 11.4 | 6.0 |
| HDIT-PU-PDMS-200 | 410.0 | 18.4 | 409.2 | 19.6 | 5.6 |
| HDIT-PU-PDMS-300 | 421.2 | 15.0 | 421.5 | 16.8 | 5.4 |

To determine the clarity, percent transmittance (% T) was measured at 550 nm. HDIT-PU was selected as reference as it showed 100% transmittance at 550 nm. It is apparent that with increasing the PDMS content in the coating formulations, an increase in the clarity was observed, thus demonstrating the excellent optical properties of the coatings developed in this example. The coating containing 250 and 300 mg PDMS have even better transparency than HDIT-PU and their values are greater than 100% T. That means PDMS as a silicon polymer does not compromise the transparency, on the contrary, it not only endowed anti-smudge properties but also enhanced the clarity of the HDIT-PU-PDMS coatings. The results are summarized in Table 10.

TABLE 10

Transmittances for Example 2

| Sample ID | % Transmission |
|---|---|
| PU | 100.89 |
| HDIT-PU | 100 |
| HDIT-PU-PDMS-20 | 97.86 |
| HDIT-PU-PDMS-40 | 98.25 |
| HDIT-PU-PDMS-60 | 98.48 |
| HDIT-PU-PDMS-80 | 99.22 |
| HDIT-PU-PDMS-100 | 99.28 |
| HDIT-PU-PDMS-150 | 99.62 |
| HDIT-PU-PDMS-200 | 99.9 |
| HDIT-PU-PDMS-250 | 100.65 |
| HDIT-PU-PDMS-300 | 100.9 |

To investigate the self-healing thermal behavior of the coatings, DSC analysis of PU, HDIT-PU, HDIT-PU-PDMS-100, HDIT-PU-PDMS-200 and HDIT-PU-PDMS-300 were performed. There were broad endothermal peaks in the range of 100-170° C. that correspond to the disconnection of the dynamic urethane bonds created as a result of reaction between OH of propyl gallate and isocyanate of HDIT. This temperature window corresponds with the self-healing temperature (120° C.) that is caused by the dynamic exchange of the urethane bond.

Example 3

Self-Healing and Self-Cleaning Omniphobic Epoxies

Example 3 provides illustrative examples of self-healing omniphobic epoxies using a hindered amine reversible polyfunctional linker.

Sample 3.1: Epoxy self-healing coatings were forming with di-t-butylethylene diamine. HDIT (UH80; "D") and amino-functional PDMS ($M_n$=2500 g/mol; "E") were mixed dropwise under stirring, which was added under stirring to di-t-butylethylene diamine ("C") dissolved in 1 mL acetone (Solution 1). Di-epoxidized propylene glycol ($M_n$=380 g/mol; "A") and epxodized bisphenol A ($M_n$=1075 g/mol; "B") were dissolved in 2 mL acetone (Solution 2). Solutions 1 and 2 were then mixed and cast onto glass slides after 5 min, 1 h, 2 h, and 4 h. Once the solvent was gone, the coated slides were heated at 80° C. for 12 h to cure the coatings, which were then tested for self-healing properties. The coatings are summarized in Table below and they demonstrated self-healing behavior after heating at 120° C. for 20 minutes.

TABLE 11

Composition for Sample 3.1 (Acetone Solvent)

| Sample ID | A (mg) | B (mg) | C (mg) | D (mg) | E (mg) |
|---|---|---|---|---|---|
| Reference | 170 | 500 | 160 | 12 | — |
| PDMS-1 | 170 | 300 | 127 | 16 | 25 |
| PDMS-2 | 170 | 300 | 127 | 20 | 50 |

Sample 3.2: Epoxy self-healing coatings were forming with di-t-butylethylene diamine. HDIT (UH80; "D") and amino-functional PDMS ($M_n$=2500 g/mol; "E") were mixed dropwise under stirring, which was added under stirring to di-t-butylethylene diamine ("C") dissolved in 1 mL acetonitrile (Solution 1). Di-epoxidized propylene glycol ($M_n$=380 g/mol; "A") and epxodized bisphenol A ($M_n$=1075 g/mol; "B") were dissolved in 2 mL acetonitrile (Solution 2). Solutions 1 and 2 were then mixed and cast onto glass slides after 5 min, 1 h, 2 h, and 4 h. Once the solvent was gone, the coated slides were heated at 80° C. for 12 h to cure the coatings, which were then tested for self-healing properties. The coatings are summarized in Table 12 below and they demonstrated self-healing behavior after heating at 120° C. for 20 minutes.

TABLE 12

Composition for Sample 3.2 (Acetonitrile Solvent)

| Sample ID | A (mg) | B (mg) | C (mg) | D (mg) | E (mg) |
|---|---|---|---|---|---|
| Reference | 170 | 500 | 160 | 12 | — |
| PDMS-1 | 170 | 300 | 127 | 16 | 25 |
| PDMS-2 | 170 | 300 | 127 | 20 | 50 |

Sample 3.3: Epoxy self-healing coatings were forming with di-isopropylethylene diamine. HDIT (UH80; "D") and amino-functional PDMS ($M_n$=2500 g/mol; "E") were mixed dropwise under stirring, which was added under stirring to di-isopropylethylene diamine ("C") dissolved in 1 mL acetone (Solution 1). Di-epoxidized propylene glycol ($M_n$=380 g/mol; "A") and epxodized bisphenol A ($M_n$=340 g/mol; "B") were dissolved in 2 mL acetone (Solution 2).

Solutions 1 and 2 were then mixed and cast onto glass slides after 5 min, 1 h, 2 h, and 4 h. Once the solvent was gone, the coated slides were heated at 80° C. for 12 h to cure the coatings, which were then tested for self-healing properties. The coatings are summarized in Table 13 below and they demonstrated self-healing behavior after heating at 120° C. for 20 minutes.

TABLE 13

Composition for Sample 3.3 (Acetone Solvent)

| Sample ID | A (mg) | B (mg) | C (mg) | D (mg) | E (mg) |
|---|---|---|---|---|---|
| Reference | 170 | 500 | 100 | 12 | — |
| PDMS-1 | 170 | 300 | 100 | 16 | 25 |
| PDMS-2 | 170 | 300 | 100 | 20 | 50 |

Example 4

Self-Healing and Self-Cleaning Polyurethanes with Omniphobic Layer

Example 4 provides illustrative examples of self-healing omniphobic polyurethanes incorporating a top omniphobic layer. Four different urea-urethane coatings including a functionalized PDMS top layer to provide an omniphobic top coating were prepared. Briefly, a self-healing polyurethane was coated on a substrate, heated and dried, and then treated with a reactive PDMS to form a top-layer omniphobic coating layer on the underlying self-healing polyurethane layer.

Sample 4.1: Self-healing, self-cleaning urea-urethanes were synthesized by adding PDMS as a top layer (without HDIT). N, N"-Di-tert-butylethanediamine (0.172 g, 1.00 mmol, 1.00 equiv) was dissolved in THF (2 mL) and charged to 20 mL vial. To the above solution, a PU-prepolymer (ANDUR 75 DPLF, NCO content is 9.03%, 1.00 g, 1.075 mmol, 1.07 equiv) dissolved in THF (2 mL) was added dropwise. The reaction mixture was stirred for 3-4 min at room temperature. 1 ml of this solution was cast on a glass slide (2.54 cm×7.62 cm) and maintained at room temperature to remove all the visible solvent for 2-3 h, followed by heating at 70° C. for 2 h to cure and remove the remaining solvent. Next, 60 mg of $NH_2$-PDMS-$NH_2$ (PDMS diamine; $M_n$=2500 g/mol) was dissolved in 10 mL of hexane, and then the coated slides were dipped in the PDMS solution for 4-5 min in a petri dish. These PDMS-treated slides/samples were again placed at 70° C. for 1 h to cure and remove the solvent prior to evaluation and testing. The properties were assessed as follows (i) self-healing: blade cuts were healed at 60° C. within 10 min, (ii) self-cleaning: both water and oil-repellency were good, and (iii) optical clarity was excellent.

Sample 4.2: Self-healing, self-cleaning urea-urethanes were synthesized by adding PDMS as a top layer (with HDIT). To a 20 ml vail, a PU-prepolymer (ANDUR 75 DPLF, NCO content is 9.03%, 1.05 g, 1.13 mmol) and HDIT (180 mg) were added in THF (2.0 mL). To the above solution, N,N"-Di-tert-butylethanediamine (0.228 g, 1.32 mmol) dissolved in THF (2 mL) was added dropwise. The reaction mixture was stirred for 3-4 min at room temperature. 1 ml of this solution was cast on a glass slide (2.54 cm×7.62 cm) and maintained at room temperature for 3 h to remove all the visible solvent, followed by heating at 70° C. for 2 h to cure and remove the remaining solvent. Next, 60 mg of $NH_2$-PDMS-$NH_2$ (PDMS diamine; $M_n$=2500 g/mol) was dissolved in 10 mL of hexane, and then the coated slides were dipped in the PDMS solution for 4-5 minutes in a petri dish. These PDMS-treated slides/samples were again placed at 70° C. for 1 h to cure and remove the solvent prior to evaluation and testing. The properties were assessed as follows (i) self-healing: blade cuts were healed at 60° C. within 10 min, (ii) self-cleaning: both water and oil-repellency were good, and (iii) optical clarity was excellent.

Sample 4.3: Self-healing, self-cleaning polyurethanes were synthesized by adding PDMS as a top layer (without HDIT). A PU-prepolymer (ANDUR 75 DPLF, NCO content is 9.03%, 1.00 g, 1.075 mmol, 1.07 equiv) in US3 (4 mL) were charged to a 20 mL vail. To the above solution, propyl gallate (0.140 g, 0.66 mmol) was also added and the reaction mixture was stirred at 100° C. for 40 min. 1 ml of this solution was cast on a glass slide (2.54 cm×7.62 cm) and maintained at room temperature to remove all the visible solvent for 4-5 h, followed by heating at 70° C. for 2 h to cure and remove the remaining solvent. Next 60 mg of $NH_2$-PDMS-$NH_2$ (PDMS diamine; $M_n$=2500 g/mol) was dissolved in 10 mL of hexane and the above coated slides were dipped in it for 4-5 min in a petri dish. These PDMS-treated slides/samples were again placed at 70° C. for 1 h to cure and remove the solvent prior to evaluation and testing. The properties were assessed as follows (i) self-healing: blade cuts were healed at 115° C. within 10 min, (ii) self-cleaning: both water and oil-repellency were good, and (iii) optical clarity was excellent.

Sample 4.4: Self-healing, self-cleaning polyurethanes were synthesized by adding PDMS as the top layer (with HDIT). A PU-prepolymer (ANDUR 75 DPLF, NCO content is 9.03%, 1.05 g, 1.13 mmol) in US3 (4 mL) was charged to a 20 mL vail. To the above solution, propyl gallate (0.174 g, 0.82 mmol) and HDIT (110 mg) were also added, and the reaction mixture was stirred at 100° C. for 40 min. 1 ml of this solution was cast on a glass slide (12.54 cm×7.62 cm) and maintained at room temperature to remove all the visible solvent for 4-5 h, followed by heating at 70° C. for 2 h to cure and remove the remaining solvent. Next, 60 mg of $NH_2$-PDMS-$NH_2$ (PDMS diamine; $M_n$=2500 g/mol) was dissolved in 10 mL of hexane, and the above coated slides were dipped in it for 4-5 min in a petri dish. These PDMS-treated slides/samples were again placed at 70° C. for 1 h to cure. The properties were assessed as follows (i) self-healing: blade cuts were healed at 115° C. within 10 min, (ii) self-cleaning: both water and oil-repellency were good, and (iii) optical clarity was excellent.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A self-healing omniphobic composition comprising:
 a self-healing omniphobic polymer comprising a crosslinked backbone, the crosslinked backbone comprising:
  (i) first backbone segments having a structure corresponding to at least one of a urethane reaction product and a urea reaction product from at least one polyisocyanate;
  (ii) second backbone segments having a structure corresponding to at least one of a urethane reaction product and a urea reaction product from at least one functionalized omniphobic polymer having a glass transition temperature ($T_g$) of 70° C. or less and comprising at least one of an amino functional group and a hydroxy functional group;
  (iii) third backbone segments having a structure corresponding to at least one of a urethane reaction product and a urea reaction product from at least one reversible polyfunctional linker comprising at least one of a hindered secondary amino group and an aromatic hydroxy group;
  (iv) fourth backbone segments;
  (v) first linking groups reversibly linking the first backbone segments and the third backbone segments, the first linking groups comprising at least one of (A) a reversible urea reaction product between the polyisocyanate and the hindered secondary amino group of the reversible polyfunctional linker and (B) a reversible urethane reaction product between the polyisocyanate and the aromatic hydroxy group of the reversible polyfunctional linker;
  (vi) second linking groups linking the first backbone segments and the second backbone segments; and
  (vii) third linking groups linking the fourth backbone segments with at least one of the first backbone segments, the second backbone segments, and the third backbone segments.

2. The self-healing omniphobic composition claim 1, wherein the reversible polyfunctional linker comprises at least two hindered secondary amino groups.

3. The self-healing omniphobic composition claim 1, wherein the reversible polyfunctional linker has one hindered secondary amino group.

4. The self-healing omniphobic composition claim 1, wherein the reversible polyfunctional linker is selected from the group consisting of N,N'-di(t-butyl) ethylenediamine, N,N'-di(iso-propyl) ethylenediamine, N,N'-di(iso-butyl) ethylenediamine, and combinations thereof.

5. The self-healing omniphobic composition claim 1, wherein the reversible polyfunctional linker comprises at least two aromatic hydroxy groups.

6. The self-healing omniphobic composition claim 1, wherein the reversible polyfunctional linker has one aromatic hydroxy group.

7. The self-healing omniphobic composition claim 1, wherein the reversible polyfunctional linker is selected from the group consisting of gallic acid esters, benzene diols, halo-substituted benzene diols, alkyl-substituted benzene diols, bisphenols, ubiquiniol, genistein, gallic acid, pyrogailol, aloe emodin, poly(caffeic acid methyl ester), and combinations thereof.

8. The self-healing omniphobic composition claim 1, wherein the polyisocyanate comprises a diisocyanate.

9. The self-healing omniphobic composition claim 1, wherein the polyisocyanate comprises a triisocyanate.

10. The self-healing omniphobic composition claim 1, wherein the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanatocyclohexane, 1,6-diiso-cyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

11. The self-healing omniphobic composition claim 1, wherein the functionalized omniphobic polymer comprises the amino functional group.

12. The self-healing omniphobic composition claim 1, wherein the functionalized omniphobic polymer comprises the hydroxy functional group.

13. The self-healing omniphobic composition claim 1, wherein the functionalized omniphobic polymer is selected from the group consisting of functionalized polysiloxanes, functionalized polyperfluoroethers, functionalized polybutadienes, functionalized polyisobutenes, functionalized branched polyolefins, functionalized low molecular weight polyolefins, functionalized poly(meth)acrylates, and combinations thereof.

14. The self-healing omniphobic composition claim 1, wherein the functionalized omniphobic polymer comprises a mono-functional functionalized omniphobic polymer.

15. The self-healing omniphobic composition claim 1, wherein the functionalized omniphobic polymer comprises a di-functional functionalized omniphobic polymer.

16. The self-healing omniphobic composition claim 1, wherein the functionalized omniphobic polymer comprises a poly-functional functionalized omniphobic polymer.

17. The self-healing omniphobic composition claim 1, wherein the functionalized omniphobic polymer has a glass transition temperature in a range from −150° C. to 70° C.

18. The self-healing omniphobic composition claim 1, wherein the functionalized omniphobic polymer is a liquid at a temperature in a range from 10° C. to 40° C.

19. The self-healing omniphobic composition claim 1, wherein the functionalized omniphobic polymer has a molecular weight ranging from 300 to 50,000.

20. The self-healing omniphobic composition claim 1, wherein the fourth backbone segments have a structure corresponding to a reaction product of a polyurethane comprising two or more functional groups reactive with one or more of the polyisocyanate, the functionalized omniphobic polymer, and the reversible polyfunctional linker.

21. The self-healing omniphobic composition claim 20, wherein the polyurethane comprises two or more isocyanate groups as the functional groups.

22. The self-healing omniphobic composition claim 1, wherein the fourth backbone segments have a structure corresponding to a reaction product of a polyepoxide comprising two or more epoxide functional groups reactive with one or more of the functionalized omniphobic polymer and the reversible polyfunctional linker.

23. The self-healing omniphobic composition claim 22, wherein the polyepoxide is selected from the group consisting of polyepoxide-substituted aromatic hydrocarbons, aliphatic hydrocarbons, cycloaliphatic hydrocarbons, ethers thereof, esters thereof, imines thereof, and combinations thereof.

24. The self-healing omniphobic composition claim 1, wherein the first backbone segments are present in the omniphobic polymer in an amount ranging from 0.05 wt. % to 20 wt. % relative to the omniphobic polymer.

25. The self-healing omniphobic composition claim 1, wherein the second backbone segments are present in the omniphobic polymer in an amount ranging from 0.01 wt. % to 20 wt. % relative to the omniphobic polymer.

26. The self-healing omniphobic composition claim 1, wherein the third backbone segments are present in the omniphobic polymer in an amount ranging from 2 wt. % to 80 wt. % relative to the omniphobic polymer.

27. The self-healing omniphobic composition claim 1, wherein the fourth backbone segments are present in the omniphobic polymer in an amount ranging from 10 wt. % to 90 wt. % relative to the omniphobic polymer.

28. The self-healing omniphobic composition claim 1, wherein the omniphobic composition further comprises one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, poly(ethylene oxide), salts, non-ionic ingredients, polyhedral oligomeric silsesquioxane (POSS), POSS derivatives, antistatic agents, UV blockers, and combinations thereof.

29. The self-healing omniphobic composition claim 1, wherein the omniphobic composition has a water contact angle in a range from 90° to 120°.

30. The self-healing omniphobic composition claim 1, wherein the omniphobic composition has an oil contact angle in a range from 1° to 65°.

31. The self-healing omniphobic composition claim 1, wherein the omniphobic composition has a water sliding angle in a range from 1° to 30° for a 75 µl droplet.

32. The self-healing omniphobic composition claim 1, wherein the omniphobic composition has an oil sliding angle in a range from 1° to 20° for a 25 µl droplet.

33. The self-healing omniphobic composition claim 1, wherein the omniphobic composition has a homogeneous structure.

34. The self-healing omniphobic composition claim 1, wherein:
the omniphobic composition has a composite structure comprising: (i) a solid matrix comprising the first backbone segments, the third backbone segments, and the fourth backbone segments; and (ii) liquid nanodomains comprising the second backbone segments;
the liquid nanodomains have a size of 80 nm or less; and
the liquid nanodomains are (i) distributed throughout the solid matrix or (ii) substantially only occupy a thin surface layer.

35. A coated article comprising:
(a) a substrate; and
(b) a self-healing omniphobic composition according to claim 1, coated on a surface of the substrate.

36. The coated article of claim 35, wherein the substrate is selected from the group of metal, plastics, a different thermoset material, glass, wood, fabric, cellulose, lignocellulose, and ceramics.

37. The coated article of claim 35, wherein the substrate comprises a metal selected from aluminum, copper, steel, alloys thereof, and combinations thereof.

38. The coated article of claim 35, wherein the omniphobic composition has a thickness ranging from 0.01 µm to 500 µm.

39. The coated article of claim 35, wherein the omniphobic composition coating is scratch-resistant, ink-resistant, and optically clear.

40. A method for repairing a self-healing omniphobic composition, the method comprising:
(a) providing a self-healing omniphobic composition according to claim 1, wherein the self-healing omniphobic polymer has at least one instance of surface damage; and
(b) heating the surface-damaged self-healing omniphobic composition for a time sufficient and at a temperature sufficient to at least partially repair the at least one instance of surface damage by at least partially rejoining separated surfaces and at least partially reforming first linking groups at the rejoined separated surfaces.

41. The method of claim 40, wherein the at least one instance of surface damage is selected from the group consisting of cuts, punctures, dents, scratches, and combinations thereof.

42. The method of claim 40, comprising heating the surface-damaged self-healing omniphobic composition for a time in a range from 1 min to 72 hours.

43. The method of claim 40, comprising heating the surface-damaged self-healing omniphobic composition at a temperature in a range from 18° C. to 150° C.

* * * * *